(12) United States Patent
Hassel et al.

(10) Patent No.: US 11,318,947 B2
(45) Date of Patent: May 3, 2022

(54) ESTIMATING SURFACE FRICTION COEFFICIENTS USING REAR-WHEEL STEERING EXCITATIONS

(71) Applicant: Volvo Car Corporation, Gothenburg (SE)

(72) Inventors: Tomas Martin Hassel, Torup (SE); Derong Yang, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 181 days.

(21) Appl. No.: 16/725,965

(22) Filed: Dec. 23, 2019

(65) Prior Publication Data

US 2021/0188284 A1 Jun. 24, 2021

(51) Int. Cl.
*B60W 40/068* (2012.01)
*B60W 10/20* (2006.01)
*B60W 30/182* (2020.01)

(52) U.S. Cl.
CPC .......... *B60W 40/068* (2013.01); *B60W 10/20* (2013.01); *B60W 30/182* (2013.01); *B60W 2556/45* (2020.02); *B60W 2720/26* (2013.01)

(58) Field of Classification Search
CPC .. B60W 40/068; B60W 10/20; B60W 30/182; B60W 2556/45; B60W 2720/26
See application file for complete search history.

(56) References Cited

U.S. PATENT DOCUMENTS 5,747,682 A * 5/1998 Hirano ................ B60T 8/17551
73/115.07
6,473,682 B1 10/2002 Nakamura
6,549,842 B1 4/2003 Hac et al.
6,597,980 B2 7/2003 Kogure
6,659,570 B2 * 12/2003 Nakamura .......... B60T 8/17552
303/146
8,682,599 B2 * 3/2014 Shiozawa ............... B60T 8/172
702/41

(Continued)

FOREIGN PATENT DOCUMENTS

EP 3106360 B1 4/2018

OTHER PUBLICATIONS

"ZF: Active Kinematics Control: Steering Impulses from the Rear Axle," Auto Components of India, Feb. 6, 2015, 6 pp.

(Continued)

*Primary Examiner* — Peter D Nolan
*Assistant Examiner* — Mikko Okechukwu Obioha
(74) *Attorney, Agent, or Firm* — Shumaker & Sieffert, P.A.

(57) ABSTRACT

Techniques are described for estimating surface friction coefficients using lateral force excitations of one or more rear wheels of a rear wheel steering vehicle. In one example, a computing system is configured to cause excitation of a rear wheel using a lateral force that causes the rear wheel to initiate turning. The computing system may determine one or more slip angles that result from the excitation and determine a relationship between the lateral force and the slip angles. From the lateral force and slip angle relationship, the computing system may estimate the friction coefficient of a surface and may cause maneuvering of the rear wheel steering vehicle, or of another networked vehicle, to be based at least in part on the friction coefficient estimated for a particular driving surface.

20 Claims, 10 Drawing Sheets

(56) References Cited

U.S. PATENT DOCUMENTS

| | | | | |
|---|---|---|---|---|
| 8,983,749 | B1* | 3/2015 | Singh | B60T 8/1725 |
| | | | | 701/71 |
| 9,073,566 | B2 | 7/2015 | Takenaka et al. | |
| 9,475,500 | B2 | 10/2016 | Grimm et al. | |
| 9,944,132 | B2 | 4/2018 | Israelsson et al. | |
| 10,018,472 | B2 | 7/2018 | Rander et al. | |
| 10,144,433 | B2 | 12/2018 | Jonasson et al. | |
| 10,407,076 | B2 | 9/2019 | Luo et al. | |
| 2006/0015236 | A1* | 1/2006 | Yamaguchi | B60T 8/1769 |
| | | | | 701/69 |
| 2006/0041365 | A1* | 2/2006 | Mori | B60W 40/103 |
| | | | | 701/70 |
| 2006/0273657 | A1* | 12/2006 | Wanke | B60T 8/17555 |
| | | | | 303/146 |
| 2008/0262692 | A1* | 10/2008 | Kogure | B60W 40/068 |
| | | | | 701/90 |
| 2009/0118905 | A1* | 5/2009 | Takenaka | B60W 40/064 |
| | | | | 701/41 |
| 2011/0209521 | A1* | 9/2011 | Shiozawa | B60L 15/2036 |
| | | | | 73/9 |
| 2011/0218700 | A1* | 9/2011 | Mori | B60W 30/025 |
| | | | | 701/31.4 |
| 2011/0282627 | A1 | 11/2011 | Jang et al. | |
| 2018/0105181 | A1 | 4/2018 | Skold et al. | |
| 2019/0126933 | A1 | 5/2019 | Jonasson et al. | |
| 2021/0171044 | A1* | 6/2021 | Kim | B60T 8/172 |
| 2021/0188284 | A1* | 6/2021 | Hassel | B60W 10/20 |

OTHER PUBLICATIONS

Ahn et al. "Robust Estimation of Road Friction Coefficient," 2011 American Control Conference, Jun. 2011, pp. 3948-3953.

Li et al., "Integrated Longitudinal and Lateral Tire/Road Friction Modeling and Monitoring for Vehicle Motion Control," IEEE Transactions on Intelligent Transportation Systems, vol. 7, No. 1, Mar. 2006, 19 pp.

Maoqi et al., "The effect of parallel steering of a four-wheel drive and four-wheel steer electric vehicle during spinning condition: a numerical simulation," IOP Conference Series: Materials Science and Engineering, Mar. 2019, 12 pp.

Shekhar, "Stability Analysis during Active Tire Excitation for Friction Estimation," KTH Royal Institute of Technology; School of Engineering Sciences, 2017, 90 pp. (Applicant points out, in accordance with MPEP 609.04(a), that the year of publication, 2017, is sufficiently earlier than the effective U.S. filing date, so that the particular month of publication is not in issue.).

U.S. Appl. No. 16/562,239, by Yang et al., filed Sep. 5, 2019.

Pacejka, "Tire and Vehicle Dynamics (Third Edition)," Science Direct, Elsevier, 2012; Chapter 3, Section 3.2.3 Interaction between Lateral and Longitudinal Slip (Combined Slip) pp. 100-111, and Chapter 4, Section 4.2.2 Combined Slip Conditions pp. 158-162. (Applicant points out, in accordance with MPEP 609.04(a), that the year of publication, 2012, is sufficiently earlier than the effective U.S. filing date, so that the particular month of publication is not in issue.).

* cited by examiner

ESTIMATING SURFACE FRICTION COEFFICIENTS USING REAR-WHEEL STEERING EXCITATIONS

TECHNICAL FIELD

This disclosure relates to computing systems for estimating surface friction.

BACKGROUND

Some vehicles feature autonomous or semi-autonomous driving capabilities that enable a vehicle to automatically control various aspects of the vehicle while driving, such as the steering angle of each wheel. For example, a computing system of the vehicle may control the steering to keep the vehicle within a lane or control a speed of the vehicle to maintain a safe following distance from another vehicle. In some instances, a road surface may be more or less slippery based on weather conditions, time of day, etc. Autonomous or semi-autonomous vehicles may not be able to determine the current road conditions and, thus, may not be able to properly control a vehicle for a current road condition.

SUMMARY

In general, the disclosed subject matter relates to techniques for estimating friction coefficients of a driving surface using lateral force excitations applied to one or more rear wheels of a vehicle with rear wheel steering (RWS), which may enable autonomous and semi-autonomous systems to better control the vehicle for the current road conditions. In some instances, rather than just using lateral force excitations, longitudinal force excitations may be used in conjunction with lateral force excitations to estimate the surface friction. Longitudinal force excitations, however, generally involve applying two equal and opposite longitudinal forces on a wheel of a vehicle, and thus, tend to be inadvertently perceived by a driver of the vehicle while driving. For example, the computing system of a vehicle may cause equal and opposite forces to be applied to a tire of a vehicle using coordinated acceleration and braking maneuvers. As such, passengers of the vehicle, including the driver, may feel a "jerk" feeling caused by a sudden forward acceleration coupled with the backward braking force. Moreover, the use of longitudinal force excitations tends to introduce unnecessary pitch changes in the vehicle as a result of the longitudinal force application. In addition, certain surface friction estimation algorithms may have low availability and/or confidence due to the inability to excite the wheels of a vehicle to a sufficient degree to estimate peak tire force using a tire model. For example, longitudinal friction probing may not be available where a vehicle is not currently in a braking mode. In addition, lateral friction probing of the front wheels of a vehicle causes changes in front wheel steering angles, which can be perceived by the driver or passengers of a vehicle and affect normal driving of the vehicle. Thus, as described herein, lateral force excitations of the rear wheels of a vehicle offer certain advantages over longitudinal force excitations, although in some instances, both forms of excitations may be used together in order to estimate surface friction coefficients.

A computing system of a RWS vehicle may cause a lateral force excitation of a rear wheel that initiates turning of the rear wheel in a lateral direction. For example, the lateral force excitation may cause the rear wheel to initiate turning in a left or right lateral direction relative to the direction of rotation of the wheel prior to the excitation or if the vehicle is not in motion, the direction of rotation of the wheel if the vehicle were to be in motion at that time. In some examples, a lateral force excitation may cause a rear wheel to pivot about a z-axis of the respective rear wheel, where the z-axis would virtually extend in a straight line from above the vehicle through a center of the respective rear wheel (e.g., the wheel hub) and toward the tire-surface contact patch (e.g., the surface on which vehicle is located, such as a traveling surface). In any event, lateral force excitations may result in the rear wheel or front wheels turning laterally left or right.

The computing system may determine one or more slip angles of the rear wheel that correspond to increases in magnitude of the lateral force caused by the lateral force excitation. In some examples, the computing system may determine a relationship between changes in the slip angles as a function of the lateral force increasing in magnitude. The relationship between slip angles and lateral force magnitudes for a particular rear wheel may be modeled using a tire model curve. From the tire model curve, the computing system may estimate a friction coefficient of the surface based on peak values of the curve and/or by extrapolating data from slip angle data below a slip angle threshold. Data extrapolation techniques may reduce the amount of lateral force applied to the wheel before the computing system can obtain, via the excitation, certain peak values for the tire model curve.

In some examples, the computing system may determine the slip angles of one or more rear wheels during lateral force excitations and determine how much the slip angle of the wheel is affected by the lateral force. That is, different surfaces cause the slip angle of a wheel to change at different rates with respect to an applied lateral force due to the friction coefficient of the given surface. In some instances, the computing system may cause the lateral force excitation of a rear wheel to stop once a slip angle threshold is satisfied, such that the computing system does not permit the slip angle to change more than a particular amount as a result of the lateral force excitation. Similarly, the computing system may cause the lateral force excitation to stop once a threshold amount of slip angle data is obtained that would allow the computing system, or an external computing system, to effectively extrapolate from the slip angle data obtained in order to determine a tire model curve that approximates a friction coefficient of a surface.

The vehicle may use the determined coefficient to adjust driving parameters of the vehicle and may share the friction information with other vehicles. For example, the computing system for one vehicle may update a surface friction map indicative of an estimated surface friction of a particular surface, where the surface friction map may be accessible by other vehicles. In some examples, the computing system for one vehicle may output or transmit, via a network, raw data from a particular lateral force excitation (e.g., slip angles, lateral force magnitudes, tire curve models, etc.), estimated surface friction coefficients, and/or portions or all of an updated surface friction map, to an external computing system or another vehicle. In some examples, the computing system for a vehicle may output raw data to a computing system external to the vehicle, such that the external computing system may estimate the surface friction at a location for a portion of a road or surface segment where the lateral force excitation event occurred. The external computing system may then store the estimated surface friction coefficients or transmit the surface friction coefficients to the vehicle that performed the lateral force excitation or to one or more other vehicles.

In some examples, rear wheel lateral force excitations allow a vehicle excitation system to reach a relatively higher excitation level of the rear wheels compared to a potential excitation level of a front wheel while maintaining the normal driving state of a vehicle. For example, a driver or passenger may perceive lateral force excitations of rear wheels to a lesser extent compared to lateral force excitations performed on the front wheels of a vehicle regardless of a potentially higher excitation level. As such, rear wheel lateral force excitations may be applied to the rear wheels in various directions (e.g., toe-in, toe-out, etc.) while the vehicle maintains a relatively normal driving state, in addition to maintaining relative stability of the vehicle during such rear wheel lateral force excitations.

In this way, estimating surface friction coefficients using lateral force excitations may increase the driver and passenger experience by reducing or eliminating longitudinal force excitations that tend to be noticeable while driving and that increase the amount of wear-and-tear on the tires and brakes of the vehicle. In addition, estimating surface friction coefficients using lateral force excitations of a rear or rear-most wheel of a vehicle may be done while a vehicle is already performing an excitation of the wheel, such as while the vehicle is turning. In such examples, the computing system of the vehicle may utilize existing excitation amounts of the rear or rear-most wheel to estimate a surface friction coefficient without exciting the wheels more than necessary to complete the turn.

In one example, a computing system for estimating surface friction coefficients is described. The computing system includes at least one processor and a memory. The memory includes instructions that, when executed, cause the at least one processor to: cause excitation of a first rear wheel of a vehicle using a first lateral force that causes the first rear wheel to initiate turning in a first lateral direction; determine one or more slip angles that result from excitation of the first rear wheel; identify a surface friction coefficient, the surface friction coefficient being based at least in part on a relationship between changes in magnitude of the first lateral force and the one or more slip angles; and cause maneuvering of the vehicle to be based at least in part on the estimated surface friction coefficient.

In another example, an apparatus configured to estimate surface friction coefficients is described. The device includes means for causing excitation of a first rear wheel of a vehicle using a first lateral force that causes the first rear wheel to initiate turning in a first lateral direction; means for determining one or more slip angles that result from excitation of the first rear wheel; means for identifying a surface friction coefficient, the surface friction coefficient being based at least in part on a relationship between changes in magnitude of the first lateral force and the one or more slip angles; and means for causing maneuvering of the vehicle to be based at least in part on the estimated surface friction coefficient.

In another example, a method for estimating surface friction coefficients includes causing excitation of a first rear wheel of a vehicle using a first lateral force that causes the first rear wheel to initiate turning in a first lateral direction; determining one or more slip angles that result from excitation of the first rear wheel; identifying a surface friction coefficient, the surface friction coefficient being based at least in part on a relationship between changes in magnitude of the first lateral force and the one or more slip angles; and causing maneuvering of the vehicle to be based at least in part on the estimated surface friction coefficient.

In another example, a non-transitory computer-readable storage medium includes instructions that, when executed by at least one processor of a computing system of a vehicle, cause the at least one processor to: cause excitation of a first rear wheel of a vehicle using a first lateral force that causes the first rear wheel to initiate turning in a first lateral direction; determine one or more slip angles that result from excitation of the first rear wheel; determine a relationship between changes in magnitude of the first lateral force and the one or more slip angles; estimate, from the relationship between changes in magnitude of the first lateral force and the one or more slip angles, a surface friction coefficient; and cause maneuvering of the vehicle to be based at least in part on the estimated surface friction coefficient.

In another example, a non-transitory computer-readable storage medium includes instructions that, when executed by at least one processor of a computing system of a vehicle, cause the at least one processor to: cause excitation of a first rear wheel of a vehicle using a first lateral force that causes the first rear wheel to initiate turning in a first lateral direction; determine one or more slip angles that result from excitation of the first rear wheel; identify a surface friction coefficient, the surface friction coefficient being based at least in part on a relationship between changes in magnitude of the first lateral force and the one or more slip angles; and cause maneuvering of the vehicle to be based at least in part on the estimated surface friction coefficient.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
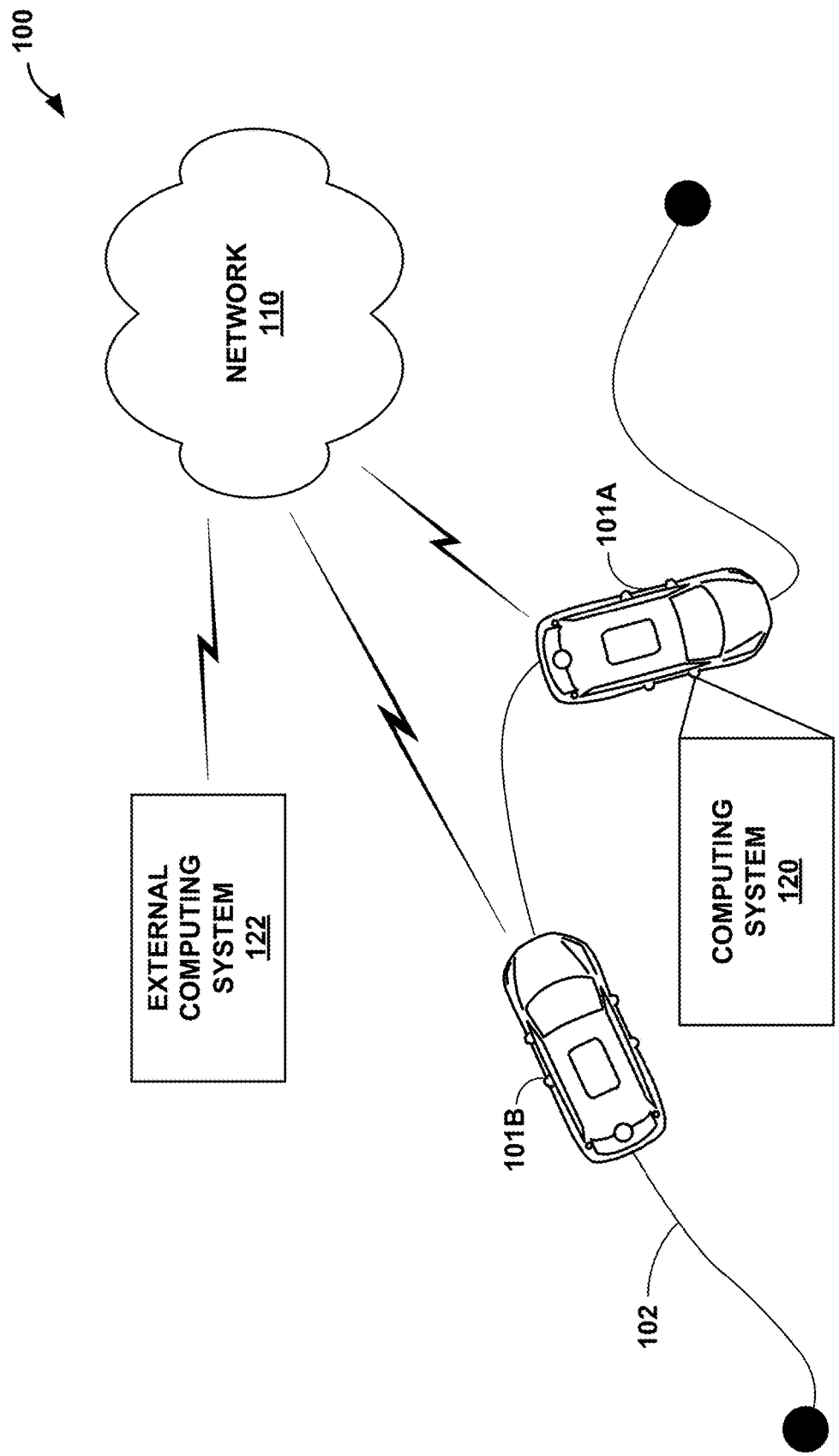
FIG. 1 is a conceptual block diagram illustrating an example system configured to estimate friction coefficients of a surface, in accordance with one or more techniques of this disclosure.

FIG. 1 is a conceptual block diagram illustrating an example system configured to estimate friction coefficients of a surface, in accordance with one or more techniques of this disclosure. As shown in the example of FIG. 1, system 100 includes a vehicle 101A and at least one computing system 120. In some examples, vehicle 101A may include the at least one computing system 120 as an on-board computing system. In some examples, system 100 may include a network 110 and an external computing system 122. In addition, system 100 may include additional vehicles, such as vehicle 101B, that can interface with components of network 110 (e.g., external computing system 122, vehicle 101A, etc.).

In some examples, system 100 may include multiple vehicles 101A and 101B (collectively, vehicles 101) navigating a surface 102. Surface 102 may be a designated roadway, such as a freeway or surface street or surface 102 may be an off-road surface on which vehicles 101 may nevertheless travel (e.g., sand dunes, frozen lakes, etc.).

Vehicles 101 may include any type of autonomous, semi-autonomous, or non-autonomous vehicles. In some instances, vehicle 101A may maneuver based on the surface friction of a surface 102 (e.g., a coefficient of friction between the tires and the surface 102). For example, the vehicle may adjust the actual speed of the vehicle based on the surface friction while slowing down and/or during autonomous or semi-autonomous driving situations.

Vehicles 101 may include any vehicles having at least one front wheel and at least one rear wheel. In some examples, vehicles 101 may have multiple wheels coupled together, such as multiple left rear wheels coupled together, or multiple right rear wheels coupled together. Although shown as an automobile in the example of FIG. 1, vehicles 101 may represent any type of vehicle, including a car, a truck, a semitruck, a bus, a recreational vehicle (RVs), a tractor, an all-terrain vehicle (ATV), an aero vehicle, a motorcycle, or any other type of vehicle. Other example configurations of vehicles 101 are further described with respect to FIG. 2. While certain example techniques of this disclosure are discussed in terms of RWS vehicles, vehicles 101 of this disclosure are not so limited, and a person of skill in the art will understand that vehicles 101, in addition to being RWS vehicles, may also be equipped with other driving features, such as all-wheel drive (AWD), traction control, independent suspension, etc.

In an illustrative example, some RWS vehicles, such as vehicle 101A, feature, so-called, four-wheel steering (4WS) or all-wheel steering (AWS) capabilities that allow a vehicle to control the steering angle of one or more rear wheels, similar to how the vehicle controls the steering angle of the front wheels, and may control the steering angle of one or more front wheels, as well. In some RWS vehicles, each rear wheel may be independently actuated, such that a first rear wheel can have a different steering angle compared to that of another rear wheel. In addition, the rear wheels can have different steering angles relative to steering angles of the front wheels. In some instances, vehicle 101A may be configured to only turn the rear wheels. In other examples, vehicle 101A may include an AWS or 4WS vehicle configured to turn all wheels of the vehicle including the rear wheels and/or rear-most wheels.

RWS can assist with slowing or braking of a car, for example, by turning the rear wheels slightly inward toward each other to improve deceleration (e.g., toe-in driving) of vehicle 101A or can assist with turning (e.g., cornering) by turning the rear wheels opposite the turning direction of vehicle 101A to effectively reduce the turning radius of vehicle 101A. As another example, an RWS vehicle may also effectively drive horizontally, such as when parallel parking, by turning all wheels of vehicle 101A, including the front and rear wheels, in a same direction.

Vehicles 101 may be communicatively coupled to one another and/or to external computing system 122 via network 110. Network 110 may represent any type of network by which communication between vehicles 101 and computing system 120 may be accomplished. Network 110 may represent a public network (e.g., the Internet), a private network, a cellular network (including various cellular data network, such as a 3G, 4G and/or 5G network), a personal area network, or combinations thereof.

Computing system 120 (described in more detail below with reference to FIG. 3) may represent one or more devices configured to estimate surface friction coefficients using lateral force excitations, in accordance with one or more techniques of this disclosure. For ease of illustration, computing system 120 is described as included within vehicle 101A of FIG. 1. For example, computing system 120 may be an on-board or in-vehicle computer configured to monitor and control various vehicle operations, such as steering, braking, climate control, safety operations, etc. It should be understood that while shown as being included within vehicle 101A, computing system 120 may be included with any one of vehicles 101. In addition, certain components of computing system 120, described with reference to FIG. 3, may be included as part of external computing system 122 where appropriate, such as when storing certain data. For example, computing system 120 may transmit raw or processed surface friction data, engine performance data, safety diagnostic data, fuel economy data, etc. to external computing system 122, where external computing system 122 may store the data for subsequent access and/or may provide feedback to computing system 120 of one vehicle based on data received from other vehicles (e.g., surface friction data).

External computing system 122 may represent one or more devices configured to communicate via network 110 with vehicles 101. Examples of external computing system 122 include, but are not limited to, servers, distributed computing systems (e.g., cloud-based computing systems), desktop computers, laptop computers, etc. External computing system 122 may communicate via network 110 with vehicles 101 to monitor or otherwise retrieve data from one or more components of vehicle 101, such as a navigation system, an infotainment system, an anti-lock braking system (ABS), a traction control (TC) system, an electronic stability control (ESC) system, a friction probing system, or any other component or system integrated into vehicles 101 or in communication with vehicles 101. External computing system 122 may, in addition or as an alternative to monitoring vehicles 101, communicate with vehicles 101 to update one or more of the above noted components of vehicles 101.

In some examples, computing system 120 may use so-called "friction probes" that request wheel torques and excitations from vehicle 101A in order to estimate friction coefficients of a surface. In such instances, exciting the rear wheels of vehicle 101A may allow vehicle 101A to independently and sufficiently excite each rear wheel of vehicle 101A to estimate the surface friction coefficients. For example, vehicle 101A may be a RWS vehicle (e.g., an AWS vehicle, 4WS vehicle, 8WS vehicle, etc.) that includes electromechanical actuators configured to vary the toe angle at the rear axle. In some instances, one actuator is used for a first rear wheel and another actuator is used for a second rear wheel. That is, vehicle 101A may actively control the steering angle of the rear wheels individually.

In such instances, computing system 120 of vehicle 101A may cause excitation of one or more rear wheels of vehicle 101A in a lateral direction in order to estimate friction coefficients of a surface. For example, computing system 120 may perform lateral force excitations on one or more rear wheels of vehicle 101A to determine one or more slip angles of the wheels that result from the lateral force excitation. In some examples, a lateral force excitation includes a lateral force of a magnitude that causes a rear wheel to initiate turning in a particular lateral direction. As such, lateral force excitations may be applied to a plurality of rear wheels and slip angles may be determined for each rear wheel. For example, computing system 120 may determine various slip angles with respect to an excited rear wheel that result from computing system 120 causing the excitation of the particular rear wheel. In any event, different force magnitudes may be used for each respective rear wheel in order to maintain stability of the vehicle while in different driving modes (e.g., cornering, straight driving, etc.).

In some examples, computing system 120 of vehicle 101A may track the slip angles as the slip angles relate to the magnitude of force to determine a relationship between changes in magnitude of the first lateral force and the one or more slip angles. In some instances, the slip angles may increase, decrease, or stay the same in response to changes in magnitude of the first lateral force (e.g., increasing forces, decreasing forces, etc.). For example, computing system 120 may store, in memory, various slip angle data points as the slip angle data relates to a magnitude of lateral force. In addition, computing system 120 may store separate relationship data for each wheel in scenarios involving multiple excited wheels. In some examples, the relationship data may include a tire model curve or a table of corresponding data points used to generate the tire model curve. As such, computing system 120 may use the relationship between changes in magnitude of the first lateral force and the one or more slip angles, to estimate the surface friction coefficient. For example, computing system 120 may use extrapolation techniques to determine a peak value of a tire model curve plotted from the relationship between changes in magnitude of the first lateral force and the one or more slip angles.

In estimating the surface friction coefficients, computing system 120 of vehicle 101A may use data that corresponds to a most-excited rear wheel from a plurality of excited rear wheels. For example, computing system 120 may use data from the wheel that received the highest level of excitation, where in some instances, the lateral force excitation may not be equal for each rear wheel of vehicle 101A. For example, while vehicle 101A is turning, one rear wheel may receive a higher lateral force compared to that of another excited rear wheel, where the lateral force excitations may be controlled for each wheel such that vehicle 101A remains stable during the turn. In any event, computing system 120 may use stability controls during various driving modes, including cornering and straight driving mode. The stability controls allow computing system 120 to balance the lateral force excitations applied to multiple wheels, such that the net lateral forces cancel regardless of the turning amount for each wheel. In such examples, computing system 120 of the vehicle may determine which excited rear wheel from a plurality of excited rear wheels reached the highest level of excitation during a lateral force friction estimation event. As such, computing system 120 may use data from the most-excited rear wheel to estimate the surface friction coefficient. In any event, computing system 120 may use the estimated surface friction coefficient to maneuver vehicle 101A. For example, computing system 120 may use the estimated surface friction coefficient to control operation of vehicle 101A in order to maneuver vehicle 101A. In a non-limiting example, computing system 120 may control the speed of vehicle 101A based on the estimated surface friction coefficient.

In some examples, computing system 120 may share all or portions of the friction data (e.g., raw data, coefficient data, average coefficient data, rate of change of surface friction coefficient data, etc.) with network 110 or directly with another vehicle 101A to be used by a computing system of the other vehicle 101B to maneuver vehicle 101B. In a non-limiting example, vehicles 101A, 101B or any other vehicle traversing the surface 102 may utilize the surface friction coefficient data. In one example, vehicles 101A, 101B or any other vehicle traversing the surface 102 may utilize the surface friction coefficient data to determine safe follow distances with other vehicles, determine speed control values, contribute to building a friction coefficient map, etc. For example, vehicle 101A may transmit slip angle data and lateral force magnitude data to external computing system 122 (e.g., a remote server, cloud server, etc.). External computing system 122 may estimate a surface friction coefficient based on the slip angle data and lateral force magnitude data.

External computing system 122 may update a friction coefficient map with respect to one or more corresponding segments of surface 102. External computing system 122 may transmit the estimated surface friction coefficient to vehicle 101A. For example, external computing system 122 may transmit the updated friction coefficient map to vehicle 101A. In any event, computing system 120 may receive the surface friction coefficient, such as through receiving the updated friction coefficient map, via network 110, and utilize the surface friction coefficient to maneuver vehicle 101A. In some examples, external computing system 122 may determine which of vehicles 101 traversing surface 102 may be eligible for performing a lateral force excitation friction probe. For example, external computing system 122 may determine which of vehicles 101 traversing surface 102 may be eligible for performing a lateral force excitation friction probe in accordance with U.S. application Ser. No. 16/562, 239, by Derong Yang, filed Sep. 5, 2019, the contents of which are hereby incorporated by reference in its entirety. In addition, external computing system 122 may determine which of vehicles 101 are capable of performing rear wheel excitations, such as by requesting data from a vehicle on whether a RWS feature of a particular vehicle is currently enabled or whether a user of the particular vehicle has agreed to allow rear wheel lateral force excitations to occur for friction estimation purposes.

Figure 2:
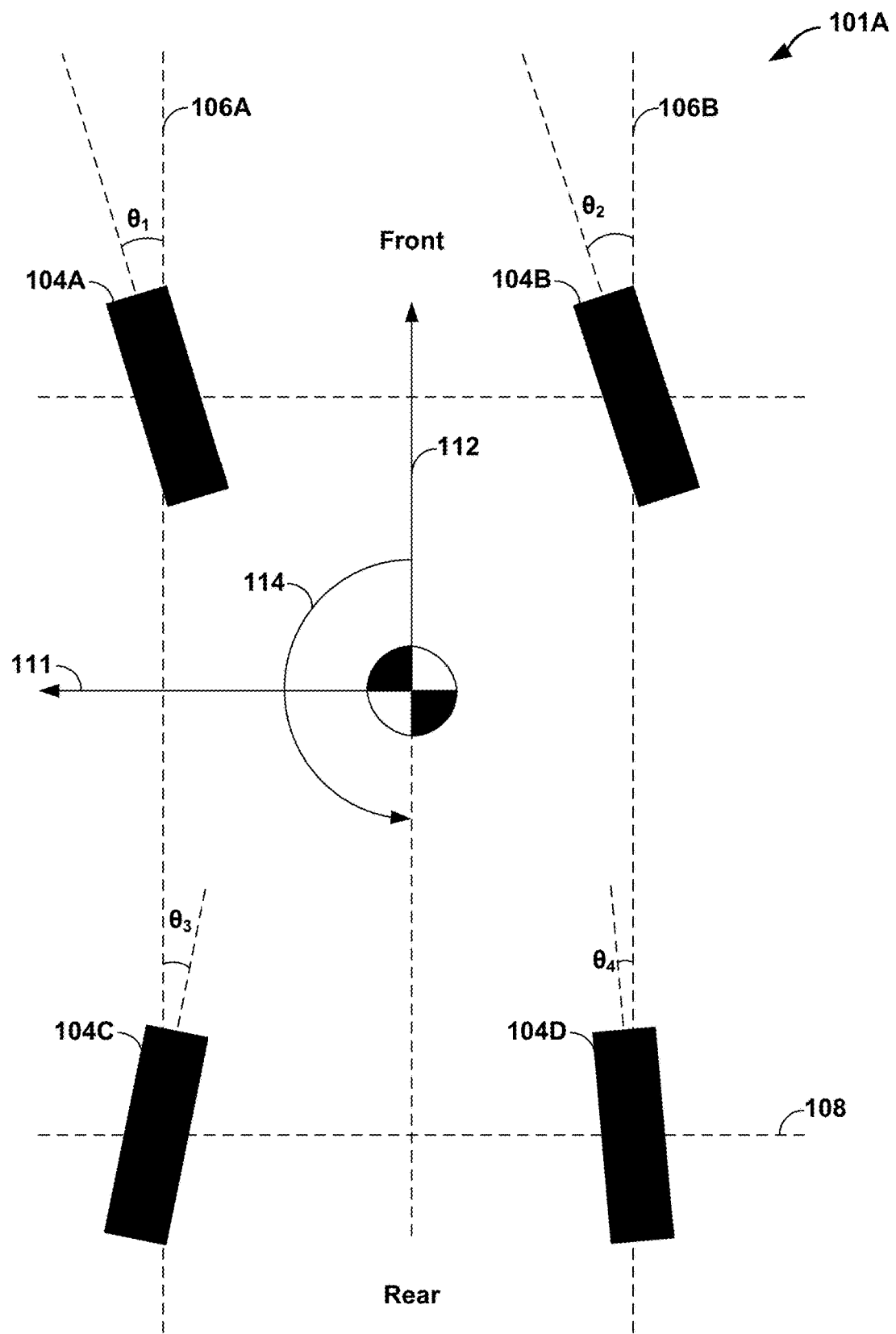
FIG. 2 is a conceptual diagram illustrating an example vehicle of FIG. 1 having RWS capabilities, in accordance with one or more techniques of this disclosure.

FIG. 2 is a conceptual diagram illustrating various steering aspects of vehicle 101A. As shown in FIG. 2, the orientation of vehicle 101A is shown as having the front of vehicle 101A pointing toward the top of the page and the rear of vehicle 101A positioned toward the bottom of the page.

In the example of FIG. 2, vehicle 101A is shown as having two front steerable wheels (104A and 104B) and two rear steerable wheels (104C and 104D). As such, vehicle 101A is a vehicle configured with RWS capabilities (hereinafter, a RWS vehicle). In some examples, a RWS steering vehicle may refer to a vehicle having steerable rear wheels. As mentioned above, however, a RWS vehicle may include an AWS vehicle, where all wheels of a vehicle are steerable including the front-most wheels. In any event, a RWS vehicle includes any vehicle capable of adjusting the steering angle of at least one rear wheel of the vehicle. For example, a RWS vehicle may include a four-wheeled vehicle with two front wheels and two rear steerable wheels, an eight-wheeled vehicle with two front wheels and six rear steerable wheels, a three-wheeled vehicle with one front wheel and two rear steerable wheels or two front wheels and one rear steerable wheel, or eighteen-wheeled vehicle with two front wheels and sixteen rear steerable wheels. While certain example techniques for estimating surface friction coefficients are described herein with respect to vehicle 101A being a four-wheeled vehicle having at least two rear steering wheels, the example techniques are not so limited, and a person of skill in the art will appreciate that the example techniques may apply to any number of RWS vehicles having any number of steerable rear wheel configurations. In some examples, an RWS vehicle may have two front steering wheels, and four rear wheels, where two of the rear wheels are the rear-most wheels and the other two rear wheels are front of the rear-most wheels but rear of the front wheels.

In some examples, wheels 104A-D of vehicle 101A may have tires mounted on corresponding wheel hubs. In some examples, vehicle 101A may comprise a front axle and at least one rear axle. Vehicle 101A may have one or more rear axles. The rear axles may include steering racks that are pivotably attached to linkage arms. The linkage arms may be connected to rear steerable wheels 104C and 104D such that when a steering rack is subjected to a lateral force, the linkage arm for rear wheel 104C or rear wheel 104D rotates about a kingpin, and thereby causes a turning motion of the rear wheel in a lateral direction. In some examples, computing system 120 may cause a lateral force excitation by causing excitation of a linkage arm via one or more control signals transmitted to a target steering rack. For example, the magnitude of the lateral force excitation may be derived from a measurement of the rack force magnitude. As such, the lateral force excitation magnitude may be used to generate a tire curve in accordance with various techniques of this disclosure. In some examples, vehicle 101A may be configured to provide independent steering of two or more rear wheels. For example, rear wheel 104C may be configured to turn separately from rear wheel 104D.

Each of the wheels 104A-104B may be configured to turn laterally to the left (as in wheels 104A, 104B, and 104D of the example of FIG. 2) or turn laterally to the right (as in wheel 104C in the example of FIG. 2). In the example of FIG. 2, the steering angle for each wheel is represented as $\theta_1$-$\theta_4$, where the steering angle is measured relative to a reference plane 106A or reference plane 106B of vehicle 101A. In some examples, reference planes 106A or 106B may be set such that the reference planes are parallel with the length of vehicle 101A or such that the planes align with the rear-to-front direction of vehicle 101A. In some examples, computing system 120 may measure the steering angle relative to a translational plane 108 of the axle rack.

In an illustrative example, vehicle 101A is shown in FIG. 2 as making a left turn or moving to the left, such as by changing lanes. Movement of vehicle 101A is illustrated using left pointing arrow 111 and forward pointing arrow 112 to illustrate propulsion forces and steering excitations causing vehicle 101A to turn leftward about axis 114. In such examples, computing system 120 of vehicle 101A may cause excitation to one of rear wheels 104C and/or 104D. For example, computing system 120 of vehicle 101A may cause an actuator of the vehicle to initiate turning of rear wheel 104C and/or 104D in a lateral direction, such as laterally inward as shown or laterally outward. The computing system 120 of vehicle 101A may use sensor data to determine, track, and/or process one or more slip angles resulting from the lateral force excitation. Using the slip angle data and the corresponding lateral force excitation data (e.g., force magnitudes), computing system 120 of vehicle 101A may estimate the surface friction coefficient, in accordance with one or more techniques disclosed herein.

Figure 3:
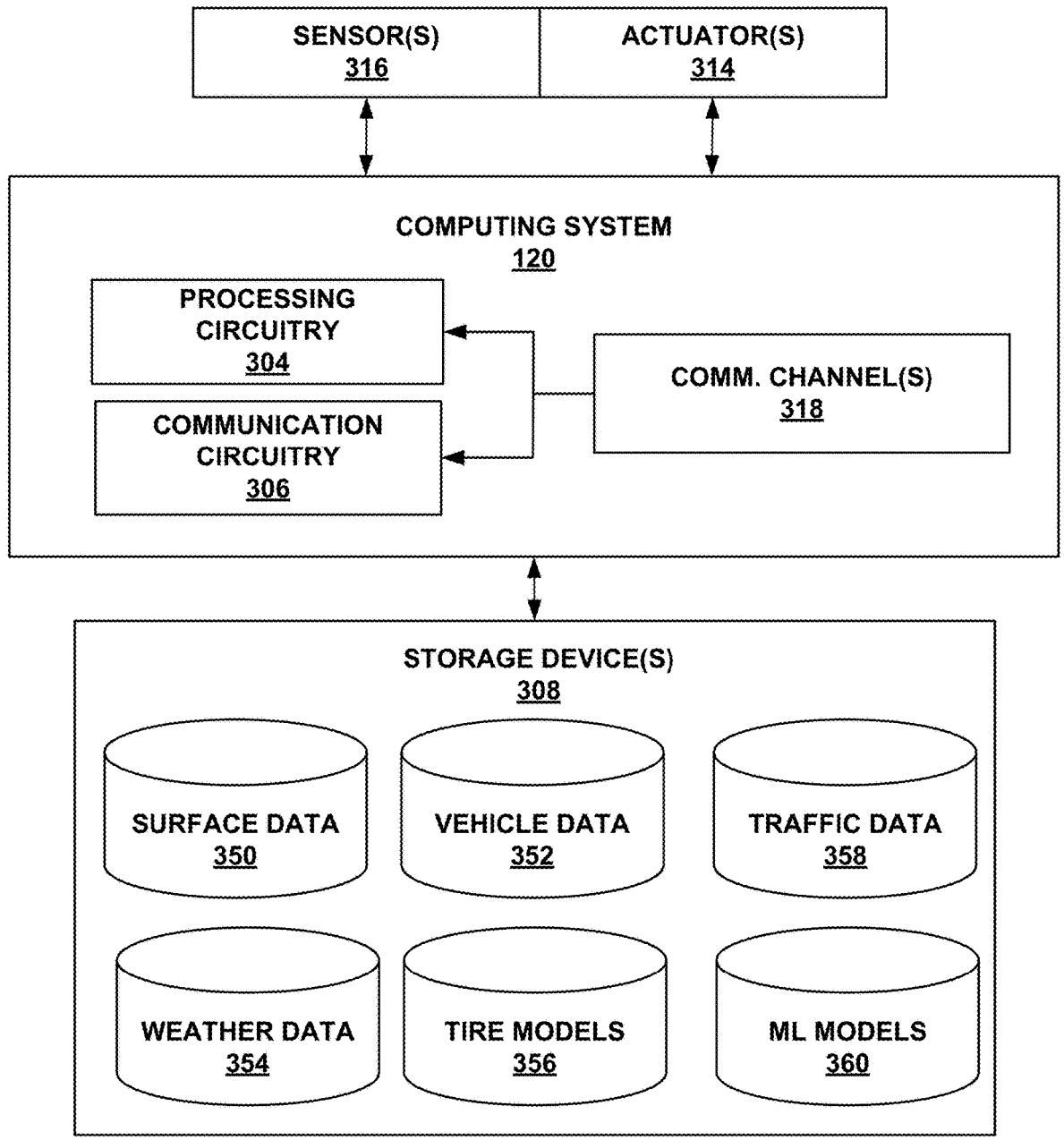
FIG. 3 is a block diagram illustrating the example computing system of FIG. 1 configured to cause lateral force excitations and identify surface friction coefficients, in accordance with one or more techniques of this disclosure.

FIG. 3 is a block diagram illustrating an example computing system 120 configured to identify surface friction coefficients, in accordance with one or more techniques of this disclosure. As illustrated in FIG. 3, computing system 120 includes processing circuitry 304, communication circuitry 306, and at least one communication channel 318. In addition, computing system 120 may include at least one storage device(s) 308 and/or one or more sensors 316. In some examples, one or more sensors 316 and/or storage device(s) 308 may include one or more devices that are separate from computing system 120. For example, storage device(s) 308, instead of being included with computing system 120, may be included with external computing system 122 or another networked device (e.g., cloud server, vehicle 101B, etc.). Likewise, sensors 316 may be included as separate devices that interface with computing system 120, as shown in FIG. 3. In addition, in some examples, computing system 120 may include more or less components than shown in FIG. 3. For example, communication circuitry 306 may be included as a separate system that interfaces with computing system 120. In such examples, communication channel(s) 318 may be separate from computing system 120, as well.

FIG. 3 illustrates only one particular example of computing system 120, and many other examples of computing system 120 may be used in other instances and may include a subset of the components included in example computing system 120 or may include additional components not shown in FIG. 3. In addition, external computing system 122 may include similar components as computing system 120, although external computing system 122 may in some examples, have a different system architecture.

Processing circuitry 304 may represent one or more processors implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more processing circuits may be distinct circuit blocks (fixed-function or programmable), and in some examples, the one or more circuits may be integrated circuits.

Communication circuitry 306 may be configured to communicate with one or more other computing systems by transmitting and/or receiving data. Communications circuitry 206 may include wired and/or wireless communication circuits. Examples of wired communication circuitry 306 include Universal Serial Bus (USB) transceivers and Ethernet transceivers, among others. Examples of wireless communication circuitry 306 include Global Positioning System (GPS) radios, cellular (e.g., LTE, 5G, etc.) radios, Bluetooth™ radios, WiFi™ radios, or any other wireless radios.

Sensors 316 may be configured to generate sensor data indicative of characteristics of vehicles 101 and/or characteristics of an environment in which vehicles 101 operate. Examples of sensors 316 include wheel speed sensors, motion sensors (e.g., inertial measurement units (IMUs), accelerometers, gyroscopes, magnetometers, etc.), tire slip angle sensors, lateral force magnitude sensors, longitudinal force magnitude sensors, temperature sensors, image sensors, radar sensors, LiDAR sensors, etc.

Sensors 316 may generate sensor data indicative of operating characteristics of one or more components of vehicle 101A during a lateral force excitation. For example, sensor data generated by sensors 316 may include motion data generated by one or more motion sensors (e.g., an IMU) or wheel speed data generated by one or more wheel speed sensors. Sensors 316 may be configured to determine the magnitude of the lateral force excitation. In addition, sensors 316 may be configured to determine the slip angles of rear wheels 104C/104D subject to the lateral force excitation or a combined slip angle of one of rear wheels 104C or 104D as a result of a combined lateral force and longitudinal force excitation on one of rear wheels 104C or 104D. Sensors 316 may transmit data to computing system 120.

In some examples, processing circuitry 304 may represent one or more electronic control units (ECUs) configured to control electronics and various subsystems of vehicles 101 or in some examples, may represent a component portion of an ECU. For example, processing circuitry 304 may control ignition timing, anti-lock braking systems (ABS), traction control systems, RWS systems, and lateral force excitations. Processing circuitry 304 may interface with one or more of sensors 316, for example by receiving data from slip angle sensors and/or force magnitude sensors, to control or support various electronics and/or subsystems of vehicles 101. Processing circuitry 304 may communicate with various components of computing system 120, such as sensors 316 and/or storage device(s) 308 via one or more communication protocols, such as a controller area network (CAN), a FlexRay communication protocol, or any other communication protocol, where such components are included with computing system 120.

Although shown as separate, processing circuitry 304 may include communication circuitry 306. In some examples, external computing system 122 may include all or some similar components attributed computing system 120. For example, external computing system 122 may include one or some of storage device(s) 308 or in some examples, may include processing circuitry 304. In one example, external computing system 122 and computing system 120 may both include processing circuitry 304 configured to perform all or some of the techniques of this disclosure in tandem with one another or separately.

Communication channels 318 may represent a unit configured to interconnect various system components for inter-component communications (physically, communicatively, and/or operatively). In some examples, communication channels 318 may include a system bus, a network connection, one or more inter-process communication data structures, or any other components for communicating data.

Storage device(s) 308 may be configured to store information within computing system 120 during operation. Storage device(s) 308 may include a computer-readable storage medium or computer-readable storage device. In some examples storage device(s) 308 includes one or more of a short-term memory or a long-term memory. Storage device(s) 308 may include, for example, random access memories (RAM), dynamic random-access memories (DRAM), static random-access memories (SRAM), magnetic discs, optical discs, flash memories, or forms of electrically programmable memories (EPROM) or electrically erasable and programmable (EEPROM) memories. That is, storage device 308 be configured for long-term storage of data as non-volatile memory space and retain data after power on/off cycles or may be configured for short-term storage of data as volatile memory and therefore not retain stored contents if powered off. In some examples, storage device(s) 308 includes multiple types of storage devices that include a combination of the aforementioned storage devices (e.g., long-term and short-term).

Storage device(s) 308 may store program instructions and/or data (e.g., tire model curve data) that, when executed, cause processing circuitry 304 to perform the techniques of this disclosure. For example, storage device 308 may be included with computing system 120 and in such examples, may provide program instructions that, when executed, cause processing circuitry 304 to perform the techniques of this disclosure. In some examples, storage device 308 may include one or more databases or data stores, such as surface data 350, vehicle data 352, weather data 354, and traffic data 358. In some examples, storage device 308 may be configured to store one or more models, or machine learning (ML) models 360. In some examples, storage device 308 may be configured to store one or more models, such as tire models 356. In some examples, tire model 356 may include a brush model that models the relationship between lateral forces on the contact path of a tire and tire slip angles. In some examples, tire model 356 may include a magic formula tire model (e.g., Hans B. Pacejka magic formula tire model). For example, tire model 356 may include a simplified magic formula tire model, such as a curve-fit empirical model. While tire model 356 is described as being a particular type of model throughout this disclosure, such as a brush model, tire model 356 may be implemented as other example tire models, such as a parametric tire-force model, a static tire-force model, or other linear or non-linear tire models.

In some examples a separate storage device 308 may be included separate from computing system 120 that stores one or more of the databases and data stores shown in FIG. 3. For example, external computing system 122 may include one or more of the databases and data stores shown in FIG. 3. In any event, computing system 120 or external computing system 122 may update data included with storage device(s) 308. In a non-limiting and illustrative example, computing system 120 or external computing system 122 may update a friction map to include a surface friction coefficient estimated for a particular road segment and store the friction map to surface data 350 in a storage device 308 included with one of vehicles 101 (e.g., computing system 120) or on network 110 (e.g., external computing system 122, data server devices, etc.).

In one example, vehicle data 352 includes historical lateral force excitation data indicating when each of vehicles 101 has previously performed a surface friction excitation maneuver, what the lateral force excitation magnitudes were during such maneuvers, what the slip angles were during such maneuvers, etc. In another instance, vehicle data 352 includes excitation maneuver preference data for each of vehicles 101 and/or the respective drivers of vehicles 101. The probing maneuver preference data may include data indicating, for each of vehicles 101, a threshold or minimum amount of time between lateral force excitation maneuvers (e.g., once per week, once per month, etc.); days, times, or locations at which lateral force excitation maneuvers are permitted and/or prohibited; whether lateral force excitation maneuvers are permitted and/or prohibited for different numbers or types of passengers; etc. In some examples, vehicle data 352 may include navigation data indicative of past, present, and/or future locations of each of vehicles 101. In addition, vehicle data 352 may include vehicle dynamics model. For example, processing circuitry 304 may determine a vehicle dynamics model for vehicle 101A and store the vehicle dynamics model to vehicle data 352. In some examples, processing circuitry 304 may receive, via communication circuitry 306, vehicle dynamics models for vehicles 101 and store the vehicle dynamics models to vehicle data 352.

In some examples, surface data 350 includes surface friction data indicative of the estimated surface friction for each of surfaces 102. In one example, the surface friction data includes a coefficient of friction between a surface and the tires of a vehicle for each surface 102. For example, surface data 350 may include a friction map that indicates the coefficient of friction for surface 102. The surface friction data may include historical estimated surface friction data. For example, the surface friction data may include the estimated surface friction and a corresponding timestamp for each friction estimate. In some examples, historical estimated surface friction data may include surface friction estimates and/or other surface friction data (e.g., slip angles, force excitation magnitudes, etc.) received from other vehicles 101 or in some instances, from external computing system 122. In addition, historical estimated surface friction data may include statistical data that is based on the friction data received. For example, historical estimated surface friction data may include standard deviation data based on a plurality of friction coefficients estimated over time and/or by other vehicles 101.

In some instances, surface data 350 includes traffic data 358 indicative of traffic levels for each surface, such as a volume or number of vehicles 101 traveling across each surface 102, density of vehicles across each surface 102, speeds (e.g., average speeds) across each surface 102, etc. In another instance, for each surface 102, surface data 350 includes data indicative of a surface material (e.g., gravel, concrete, asphalt, etc.), a surface type (e.g., road, alley, boulevard, highway, freeway, etc.), and/or surface quality (e.g., smooth, rough, etc.). In one instance, surface data 350 includes data indicating the physical surface features of each surface 102, such as whether a surface way includes a bridge, an underpass, a curve, a straight-away, etc. In yet another instance, surface data 350 includes data indicating administrative features of a surface 102, such as accident or collision data, speed limit data, construction zone data (e.g., whether surface 102 includes one or more construction zones), among others. As described herein, surface 102 may include example surfaces such as road surfaces or off-roading surfaces including: dry, wet, dirt, mud, ice, asphalt, gravel, snow, sand, ice with sand, or surface combinations thereof (e.g., ice with sand).

In some examples, processing circuitry 304 may reference an estimated type of surface 102 from surface data 350 for a particular surface 102 that vehicle 101A may be approaching. For example, processing circuitry 304 may use historical data produced by other vehicles 101, weather data, GPS data, etc. to estimate a type of surface that vehicle 101A is approaching up ahead. Processing circuitry 304 may use the reference estimate in order to determine limits on how much lateral force should be applied to the wheels. Processing circuitry 304 may determine that a certain amount of lateral force may be required based on a previous estimate for the type of road before processing circuitry 304 may receive enough data in order to extrapolate the tire model curve and estimate the surface friction coefficient from the tire model curve. For example, processing circuitry 304 may reference a friction map stored in surface data 350. In some examples, certain surface types may have been previously estimated by another one of vehicles 101 for a particular surface.

In some examples, prior to performing a lateral force excitation, processing circuitry 304 may determine a rate at which to apply the lateral force excitation based on previous estimates regarding the particular surface. In a non-limiting example, processing circuitry 304 may determine that vehicle 101A is on dry asphalt but that vehicle 101A is approaching an icy bridge. For example, processing circuitry 304 may determine that vehicle 101A is approaching a bridge and that likely has ice using data retrieved from surface data 350, weather data 354, vehicle data 352, such as GPS data, etc. In such instances, processing circuitry 304 may determine that any lateral force excitation while crossing the bridge should be performed at a slower rate relative to other surfaces, so as to not cause an instability in vehicle 101A on the potentially slippery surface or otherwise, low friction surface. This is just one example of how processing circuitry 304 may use various data available to vehicle 101A in order to better control application and timing of the lateral force excitations used to estimate the surface friction coefficients. In any event, vehicle 101A may use data received from network 110, as from other vehicles 101, and/or data stored to storage device(s) 308. In some instances, external computing system 122 may perform these various computations using network data and transmit various instructions to vehicle 101A regarding the execution of a lateral force excitation maneuver.

In another example, processing circuitry 304 may determine the availability of a lateral force excitation opportunity based on weather data 354. For example, weather data 354 may include temperature data (e.g., air temperature and/or ground temperature), precipitation data (e.g., type of precipitation, such as rain or snow; amount of precipitation; time of the precipitation (e.g., starting and/or ending time), or a combination thereof, for each surface 102. For example, processing circuitry 304 may use data from temperature sensors to determine the temperature data or precipitation data. In another example, processing circuitry 304 may determine that an air temperature has crossed a threshold air temperature, that precipitation has started or stopped, and/or that a traffic level satisfies a threshold traffic level. Processing circuitry 304 may determine timing for performing a lateral force excitation based on one or more of such data points. In an example, processing circuitry 304 may perform a lateral force excitation of a rear wheel, such as using one or more of rear wheels 104C or 104D, in response to determining that precipitation has started or stopped or that the air temperature has crossed a threshold air temperature (e.g., 0 degrees Celsius).

In some examples, processing circuitry 304 may perform lateral force excitations at certain times of the day, such as when the sun is up or when traffic is low. For example, vehicle data 352 may include navigation data indicative of past, present, and/or future locations for one or more vehicles 101. In one example, computing system 120 may cause a lateral force excitation with respect to a period of time (e.g., within a threshold amount of time from the current time, such as within the next half-hour; within a particular time frame, such as 5:00-5:30 PM; etc.).

Processing circuitry 304 may receive data indicative of the surface friction from vehicle 101A after vehicle 101A performs a lateral force excitation maneuver. In one example, the data indicative of the surface friction includes sensor data generated by sensors of vehicle 101A, such as motion data generated by one or more motion sensors (e.g., an IMU) or wheel speed data generated by one or more wheel speed sensors, among others. In another example, the data indicative of the surface friction may include the estimated surface friction (e.g., the estimated coefficient of friction between the surface 102 and the tires of vehicle 101A). In any event, processing circuitry 304 may receive slip angle data, lateral force excitation data (force magnitudes), vehicle data, such as a quantity of front and/or rear tires, etc.

Processing circuitry 304 may determine or estimate the surface friction coefficient based on the sensor data, tire models 356, and/or one or more ML models 360. Tire models 356 may be predefined or may be trained using ML models 360. Examples of ML models 360 include nearest neighbor, naïve Bayes, decision trees, linear regression, support vector machines, neural networks, k-Means clustering, Q-learning, temporal difference, deep adversarial networks, evolutionary algorithms, or other models trained using supervised, unsupervised, semi-supervised, or reinforcement learning algorithms, or combinations of any of the foregoing. Processing circuitry 304 applies, in some examples, ML models 360 and tire models 356 to the sensor data to estimate a surface friction coefficient. In other words, tire models 356 and/or ML models 360 may receive sensor data as inputs and may output data indicative of the surface friction (e.g., an estimated coefficient of friction between the surface and the wheels of vehicle 101A).

In some examples, processing circuitry 304 may determine a driving mode of vehicle 101A defined by predefined driving mode parameters. For example, processing circuitry 304 may determine that vehicle 101A is in straight driving mode, toe-in driving mode, cornering mode, high speed cornering mode, low speed cornering mode, etc. Processing circuitry 304 may determine a driving mode of vehicle 101A to determine a level of lateral force excitation to apply to rear wheels 104C/D. Processing circuitry 304 may also determine how to balance the lateral force excitations for each rear wheel based on the driving mode. For example, processing circuitry 304 may apply a first lateral force balancing scheme during a first driving mode (e.g., straight driving mode) and may apply a second lateral force balancing scheme during a second driving mode (e.g., low-speed cornering). In any event, processing circuitry 304 uses a particular balancing scheme that causes lateral force excitations applied across multiple wheels to result in a zero-net sum of forces.

According to some examples, sensors of the vehicle generate sensor data while the vehicle performs the lateral force excitation. Processing circuitry 304 or external computing system 122 may estimate the surface friction coefficient of a surface based at least in part on the sensor data. For example, vehicle 101 may include rear wheel actuators 314 that allow processing circuitry 304 to cause an excitation of a rear wheel 104C/D by causing an actuation of one or more of the rear wheel actuators 314. In some examples, processing circuitry 304 may cause a lateral force excitation by transmitting a control signal to actuator 314 or to a control box running design logic that causes actuator 314 to produce a lateral force on a wheel.

Processing circuitry 304 may cause one or more vehicles 101 to perform a surface friction excitation maneuver to estimate surface friction coefficients. In some instances, processing circuitry 304 causes vehicle 101A to perform the lateral force excitation. In some examples, vehicle 101A may receive slip angle data as a result of exciting a rear wheel using a lateral force. In some instances, vehicle 101A may transmit the force data and slip angle data to external computing system 122 via network 110. External computing system 122 may estimate the friction coefficient using data from vehicle 101A. External computing system 122 may transmit the surface friction coefficient data to vehicle 101A. In other examples, vehicle 101A estimates the surface friction coefficient and transmits the surface friction coefficient data to external computing system 122 via network 110. In some instances, the data indicative of the surface friction may include sensor data generated by sensors 316 of vehicle 101A. In one instance, the sensor data includes data indicative of characteristics of vehicle 101A, such as motion data generated by one or more motion sensors (e.g., an IMU), slip angle data, wheel speed data generated by one or more wheel speed sensors, etc. In another instance, the sensor data includes data indicative of characteristics of the environment, such as one or more temperature sensors, radar sensors, etc. Vehicle 101A may transmit all or a portion of the sensor data to computing system 120, such that processing circuitry 304 may estimate the surface friction of surface 102.

Computing system 120 and/or external computing system 122 may determine or estimate the surface friction of surface 102 based on the sensor data and one or more models 156. Tire models 356 may be pre-programmed or may be trained using ML models 360. In one example, computing system 120 applies tire models 356 to the sensor data to estimate the road friction. In other words, tire models 356 may receive sensor data as inputs and may output data indicative of the surface friction (e.g., an estimated coefficient of friction between the surface and the tires of vehicle 101A). In some examples, computing system 120 may extrapolate data to determine a tire curve. Computing system 120 may compare the tire curve (that includes the extrapolated data) to tire models 356, as further discussed with reference to FIGS. 7 and 9, in order to determine a peak value indicative of the surface friction coefficient.

In some examples, processing circuitry 304 is configured to determine a driving mode of vehicle 101A. Processing circuitry 304 may determine the driving mode of vehicle 101A prior to causing the lateral force excitation. Processing circuitry 304 may determine the driving mode based on various data of the vehicle system. For example, processing circuitry 304 may determine the driving mode based on data received from one or more tire angle sensors, data received from driver input, such as steering wheel input, GPS data, etc. Example driving modes include low-speed cornering mode, high-speed cornering mode, straight driving mode, toe-in driving mode, toe-out driving mode, parking mode, lane changing mode, or some combination thereof. For example, processing circuitry 304 may determine that vehicle 101A is currently using toe-in driving mode to slow down while turning a corner (e.g., toe-in cornering mode).

In some examples, processing circuitry 304 may determine a driving mode based on sensor data from one or more of sensor(s) 316. For example, processing circuitry 304 may determine the driving mode based on IMU sensor data. In one example, processing circuitry 304 may determine whether or not a vehicle is cornering or driving straight based on a yaw rate derived from IMU sensor data. In addition, processing circuitry 304 may determine the driving mode based on steering wheel input data. For example, processing circuitry 304 may determine whether or not the vehicle is turning or driving straight based on an amount of a steering wheel of vehicle 101A that has been turned. In another example, processing circuitry 304 may determine the driving mode based on wheel speed sensor data. In some examples, processing circuitry 304 may determine the driving mode based on a combination of vehicle and/or sensor data. For example, processing circuitry 304 may determine the driving mode based on a combination of steering wheel input data, yaw rate, wheel speed sensor data, LiDAR data, imaging data, and/or GPS data.

In some examples, processing circuitry 304 is configured to determine a directionality of the lateral force excitation based on the driving mode. For example, processing circuitry 304 may determine vehicle 101A is currently in straight driving mode. As such, processing circuitry 304 may determine the directionality of the lateral force excitation to be inward toward a center axis of vehicle 101A. That is, processing circuitry 304 may cause a lateral force excitation such that the rear wheels 104C and 104D tend to point inward toward each other. In some examples, processing circuitry 304 may be further configured to determine a magnitude of lateral force excitations to apply based on the current driving mode. Example driving modes include toe-in driving, such as the example toe-in driving described with reference to FIG. 4, cornering, such as the example cornering described with reference to FIG. 5, toe-out driving, etc. While certain techniques of this disclosure are described with reference to some certain driving modes, a person skilled in the art will understand that the techniques of this disclosure are not so limited and that rear wheel lateral force excitations may be used in various other driving modes to estimate the surface friction coefficient of the driving surface.

In some examples, processing circuitry 304 is configured to determine a directionality of the lateral force excitation based on an overall dynamic state of vehicle 101A. For example, processing circuitry 304 may use a combination of vehicle and/or sensor data to determine the overall dynamic state of vehicle 101A. In one example, processing circuitry 304 may determine the overall dynamic state of vehicle 101A based on current excitation amounts and slip angles. In some examples, processing circuitry 304 may further determine the overall dynamic state of vehicle 101A by deploying one or more vehicle dynamics models stored in vehicle data 352 that take various vehicle and/or sensor data as input to determine the overall dynamic state of 101A.

In an illustrative example, processing circuitry 304 of vehicle 101A may cause an excitation resulting in relatively high longitudinal and/or lateral tire slips during a normal driving mode, such as during a cornering and/or braking driving mode. In such examples, processing circuitry 304 may determine that rear wheel lateral force excitations applied for the purpose of estimating a surface friction coefficient should be withheld until the dynamic state of vehicle 101A returns to a dynamic state that satisfies a predetermined threshold. In such instances, the threshold dynamic state may include high or low speed driving modes, including high speed cornering, so long as the overall dynamic state of vehicle 101A in any particular driving mode is not such that performing additional rear wheel lateral force excitations would introduce instabilities to the system of vehicle 101A. For example, processing circuitry 304 may determine whether or not a vehicle instability would be caused by a rear wheel lateral force excitation that would satisfy a predefined vehicle stability threshold and if so, may determine that the rear wheel lateral force excitation should be delayed.

Figure 4:
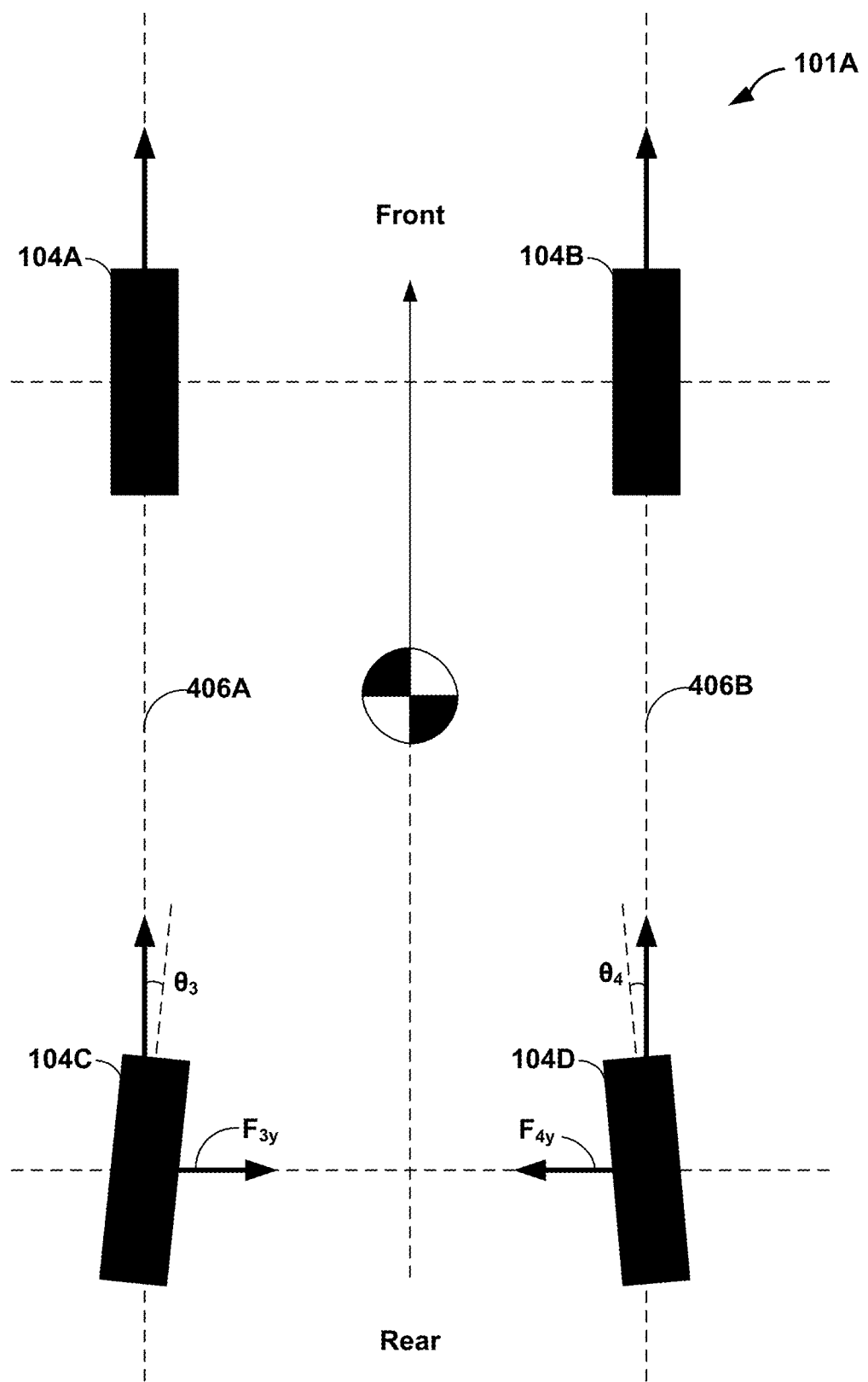
FIG. 4 is a conceptual diagram illustrating an example vehicle of FIG. 1 performing lateral force excitations on one or both rear wheels to estimate surface friction, in accordance with one or more techniques of this disclosure.

FIG. 4 is a conceptual diagram illustrating an example vehicle of FIG. 1 performing lateral force excitations on one or both rear wheels to estimate surface friction, in accordance with one or more techniques of this disclosure. In the example of FIG. 4, computing system may determine that vehicle 101A is in a predefined straight driving mode. For example, as illustrated in FIG. 4, the front wheels 104A/B are driving straight, such that processing circuitry 304 may determine that characteristics of vehicle 101A correspond to a predefined driving mode known to computing system 120.

In some examples, processing circuitry 304 may perform a lateral force excitation by causing an excitation force $F_{3y}$ inward for wheel 104C and another excitation force $F_{4y}$ inward for wheel 104D, such that the magnitudes of the excitation forces $F_{3y}$ and $F_{4y}$ cancel or negate one another. For example, processing circuitry 304 may determine force magnitudes for each of $F_{3y}$ and $F_{4y}$, such that $F_{3y}$ plus $F_{4y}$ equals 0. In some examples, processing circuitry 304 may use a vehicle dynamics model of vehicle 101A obtained from vehicle data 352 or via communication circuitry 306 in order to determine a desired lateral force to be applied to rear wheel 104C and/or rear wheel 104D.

In some examples, processing circuitry 304 may determine a target steering angle $\theta_3$ for a first rear wheel, such as rear wheel 104C in this example. In addition, processing circuitry 304 may determine a target steering angle $\theta_4$ for one of the other rear wheels, such as rear wheel 104D in this example. In one example, processing circuitry 304 may determine $\theta_4$ as product of $\theta_3$ multiplied by a control gain. For example, processing circuitry 304 may determine the target steering angle for rear wheel 104D as follows: $\theta_4 = -K_1 \times \theta_3$, where K represents the control gain, where $\theta_3$ is less than zero degrees relative to reference plane 406A and $\theta_4$ is greater than zero degrees relative to reference plane 406B. In such examples, processing circuitry 304 may receive sensor data regarding tire slip angle as measured relative to a current steering angle. For example, the tire slip angle (not shown in FIG. 4) may comprise an angular value with respect to an offset from a centerline of a current wheel angle (e.g., $\theta_3$).

In some examples, processing circuitry 304 may determine a magnitude for the lateral force excitation such that the force magnitude approaches a predetermined target point on a slip-force tire curve (e.g., such as the curve described with reference to FIG. 7). For example, the predetermined target point on a slip-force tire curve may be one that processing circuitry 304 projects, if sampled for friction data, would provide sufficient data to determine a surface friction coefficient, such as through various data extrapolation techniques. Processing circuitry 304 may adjust the steering angles for one or more rear wheels 104C and/or 104D in order to obtain the target magnitude for the lateral force excitation. Processing circuitry 304 may then determine a control gain value (e.g., K) based on the target lateral force magnitude(s). In some examples, processing circuitry 304 may adjust the control gain value in order to obtain a higher excitation for at least one rear wheel 104C and/or 104D that does not exceed a slip angle threshold. In this way, processing circuitry 304 may dynamically determine the lateral force excitation magnitudes for a left and a right rear wheel 104C and 104D, such that the lateral force excitations may avoid introducing instability to the vehicle system during the lateral force excitation maneuver, while providing the freedom to tune the force excitation magnitudes in order to achieve a sufficiently high excitation at one wheel. For example, the excitation may be high enough such that processing circuitry 304 may extrapolate data from a tire curve in order to estimate the surface friction coefficient or otherwise, determine the surface friction coefficient from the tire curve.

In some examples, processing circuitry 304 may limit the amount of lateral force excitations of rear wheels 104C or 104D in order to maintain a balance between lateral force excitation magnitudes and vehicle stability, so as not to inadvertently introduce vehicle instabilities into the vehicle system. In other examples, processing circuitry 304 may cause lateral force excitations of the rear wheels 104C or 104D in order to maintain or improve vehicle stability. For example, processing circuitry 304 may cause lateral force excitations of rear wheels 104C and/or 104D in order to maintain or improves vehicle stability.

In an illustrative example, when vehicle 101 is driving straight, processing circuitry 304 may control left wheel 104C and right wheel 104D to be set in different directions (e.g., toe-in, as shown in FIG. 4, toe-out, etc.), which may enhance the straight-driving stability of vehicle 101. For example, processing circuitry 304 may improve the overall vehicle dynamics by causing the rear wheels to turn in or out under various circumstances. In such examples, processing circuitry 304 may also determine tire slip angles of the excited rear wheels in order to then estimate the surface friction coefficients in accordance with various techniques of this disclosure. In any event, processing circuitry 304 may set the left wheel 104C and right wheel 104D to have steering angles that differ from the steering angles of the front wheels using lateral force excitations, such that the change in rear wheel steering angles result in an increased or maintained vehicle stability or vehicle steady-state. In such instances, processing circuitry 304 may make use of current lateral force excitations (e.g., excitations performed to maintain or increase stability, excitations performed for cornering) in order to estimate the surface friction coefficient without having to perform additional rear wheel lateral force excitations. For example, while processing circuitry 304 has currently set the left wheel 104C and right wheel 104D to have toe-in or toe-out steering angles to increase vehicle stability, processing circuitry 304 may estimate the surface friction coefficients using current slip angles of the most-excited rear wheel 104C or 104D to determine tire curve characteristics. That is, processing circuitry 304 may not perform additional lateral force excitations for the purpose of estimating the surface friction coefficient, as may be done in other examples, but may instead use current or previously set lateral force excitations of the rear wheels to estimate the surface friction coefficient, such as current lateral force excitations used to increase stability of the vehicle during straight driving mode or cornering mode.

Figure 5:
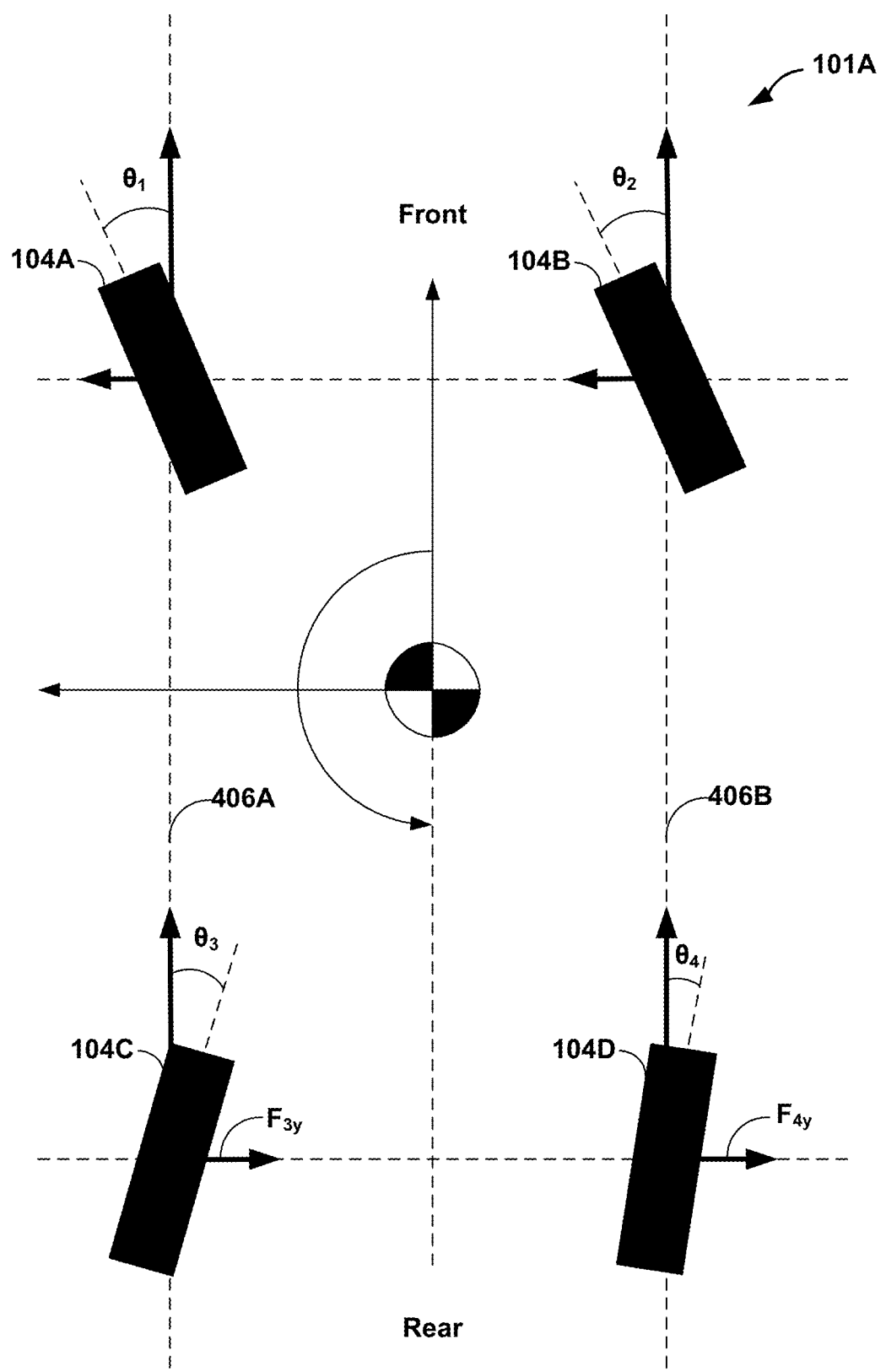
FIG. 5 is a conceptual diagram illustrating an example vehicle of FIG. 1 performing lateral force excitations on one or both rear wheels to estimate surface friction, in accordance with one or more techniques of this disclosure.

FIG. 5 is a conceptual diagram illustrating an example vehicle of FIG. 1 performing lateral force excitations on one or both rear wheels to estimate surface friction, in accordance with one or more techniques of this disclosure. In some examples, FIG. 5 may represent a tire configuration of a vehicle 101 during a cornering maneuver, such as a low-speed cornering maneuver. In such examples, processing circuitry 304 may determine the target steering angle for rear wheel 104D as follows: $\theta_4 = K_2 \times \theta_3$, where K represents the control gain, where $\theta_3$ is less than zero degrees relative to reference plane 406A and $\theta_4$ is less than or equal to zero degrees relative to reference plane 406B.

In some examples, processing circuitry 304 may determine a reference lateral force value ($F_{ref}$). The goal in such driving modes is for processing circuitry 304 to apply a magnitude of force for $F_{3y}$ and $F_{4y}$, such that $F_{3y}$ plus $F_{4y}$ equals $F_{ref}$. For example, processing circuitry 304 may use a front wheel steering angle, vehicle speed, yaw rate, etc. to determine the reference lateral force value. As such, processing circuitry 304 may determine, based at least in part on the reference lateral force value, a second lateral force (e.g., $F_{4y}$) to be applied to rear wheel 104D. In any event, processing circuitry 304 may use a vehicle dynamics model of vehicle 101A obtained from vehicle data 352 or via communication circuitry 306 in order to determine the desired lateral force to be applied to rear wheel 104C and/or rear wheel 104D.

Figure 6:
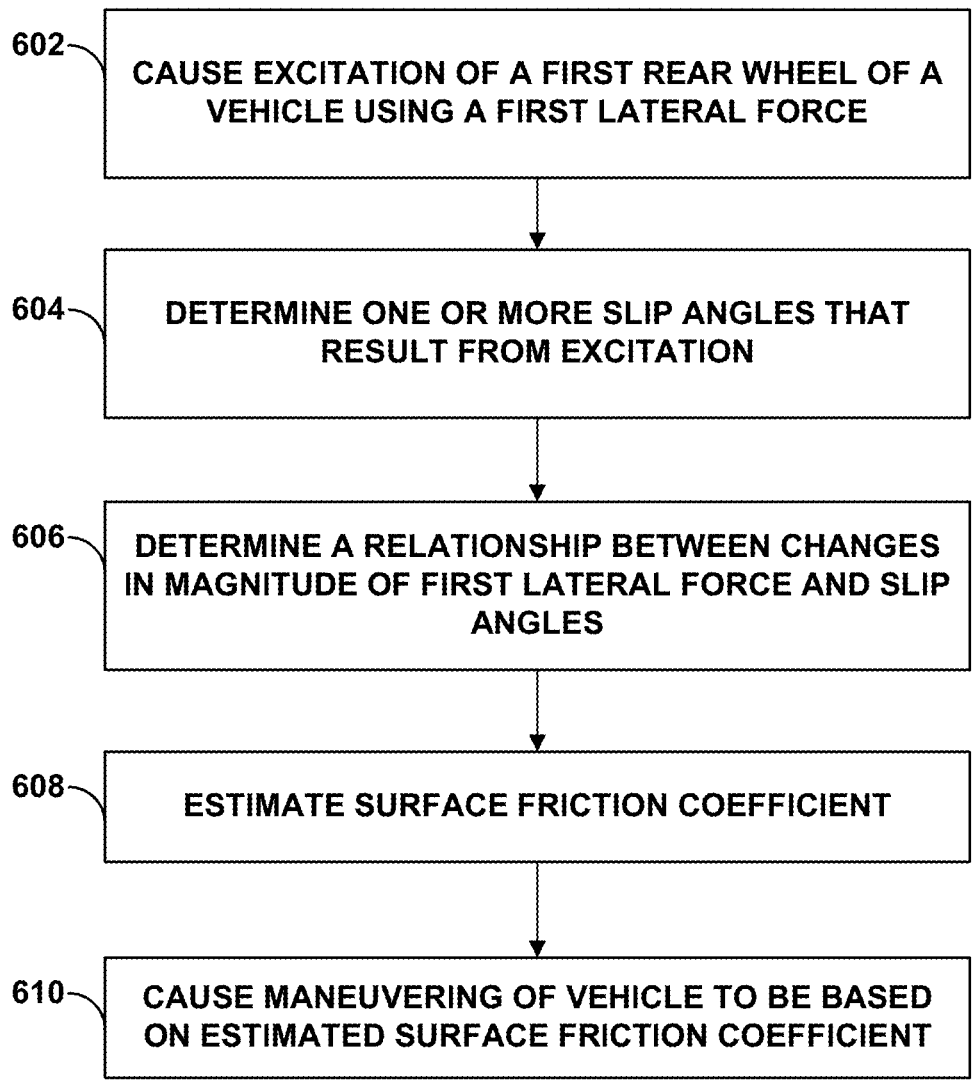
FIG. 6 is a flowchart illustrating an example technique for estimating surface friction coefficients using lateral force excitations, in accordance with one or more techniques of this disclosure.

FIG. 6 is a flowchart illustrating an example technique for estimating surface friction coefficients using rear wheel lateral force excitations, in accordance with one or more techniques of this disclosure. For purposes of illustration only, FIG. 4 is described below within the context of system 100 of FIG. 1. Although described in terms of processing circuitry 304 estimating the surface friction coefficient, the techniques of this disclosure are not so limited, and other computing devices having processing circuitry (e.g., external computing system 122) may estimate the surface friction coefficient in some instances.

In some examples, processing circuitry 304 may cause excitation of rear wheel 104C of vehicle 101A using a first lateral force (602). In some examples, the first lateral force is configured to cause rear wheel 104C to initiate turning in a first lateral direction. In some examples, processing circuitry 304 may cause a lateral force excitation to be applied to both a first rear wheel and a second rear wheel. In such examples, the rear wheels may be the rear-most wheels of vehicle 101A relative to at least one other rear wheel of vehicle 101A.

In some examples, the rear wheels may include a combination of rear-most wheels and other rear wheels of vehicle 101A, such as rear wheels of multi-wheeled trailer. In an illustrative example, vehicle 101A may include a RWS vehicle having at least four rear wheels, where at least two of the rear wheels are rear-most wheels. In such examples, processing circuitry 304 may perform lateral force excitations using any combination of the steerable wheels, such as using the two rear-most wheels, using the four rear wheels, or using one rear wheel from each zone. In any event, processing circuitry 304 may estimate the surface friction coefficients using the rear wheel reaching the highest excitation level before processing circuitry 304 detects satisfaction of a predefined threshold (e.g., slip angle threshold).

In some examples, processing circuitry 304 may determine one or more slip angles that result from excitation of one of rear wheels 104C/D (604). In an example, processing circuitry 304 may determine which rear wheel of rear wheels 104C or 104D had a higher excitation level prior to the slip angle threshold being met or prior to processing circuitry 304 determining that a sufficient amount of slip angle data was received to estimate the surface friction coefficient. As such, processing circuitry 304 may use the slip angle data received from the most excited rear wheel.

In some instances, processing circuitry 304 may use slip angle data received from multiple excited wheels. For example, processing circuitry 304 may use data received from multiple wheels reach relatively high excitation levels, in cases where more than two rear wheels are used to perform a lateral force friction estimation maneuver. For example, tire curve data determined for two of the most excited rear wheels may be used to determine a combined surface friction coefficient. In one example, processing circuitry 304 may average the excitation data to estimate the surface friction coefficient. In another example, processing circuitry 304 may combine excitation data in order to identify outlier data from either data set and remove outlier data when estimating the surface friction coefficient. In some examples, processing circuitry 304 may use data from one rear wheel to validate data received from another rear wheel, such as by comparing data obtained from one wheel to data obtained from another wheel to identify discrepancies or inconsistencies, for example, in slip angle data or in the relationship between the slip angles and changes in lateral force magnitude.

In some examples, the rear wheel or rear wheels reaching the highest excitation levels may depend on the particular driving mode of vehicle 101A, tire characteristics (e.g., tire tread, dimensions, etc.), difference in surface frictions contacted by a left wheel and a right wheel, such as when driving over a puddle of water with only one side of vehicle 101A, and various other factors. That is, at any given time, any one of the rear wheels may reach a higher excitation level than another during a particular lateral force excitation event. For example, processing circuitry 304 may identify which of rear wheels 104B/D reached the highest excitation level prior to reaching a predefined limit. As such, processing circuitry 304 may use data from the most excited wheel to estimate the surface friction coefficient in order to avoid introducing instability to vehicle 101A by overly exciting any one rear wheel.

In some examples, computing system 120 may notify the driver or passenger of vehicle 101A (e.g., via a user interface device) that a lateral force excitation event is scheduled to occur, is occurring, or has already occurred. For example, computing system 120 may request permission from the driver or passenger of vehicle 101A to perform the lateral force excitation in order to estimate the surface friction coefficient. In some examples, computing system 120 may determine that vehicle 101A is not eligible for lateral force excitations. For example, computing system 120 may determine that preference data for the driver of vehicle 101A indicates that permission has not been given to perform lateral force excitations to estimate surface friction coefficients. In another example, processing circuitry 304 may determine that vehicle 101A is not eligible for lateral force excitations based on characteristics of vehicle 101A (e.g., tire size, tread level, etc.).

In some examples, processing circuitry 304 may transmit slip angle data and lateral force magnitude data, via network 110, to external computing system 122. In such examples, external computing system 122 may utilize such data to estimate the surface friction coefficient. In some examples, processing circuitry 304 may estimate the surface friction coefficient based on such data and transmit the surface friction coefficient to external computing system 122. In any event, external computing system 122 may update a friction map based on the surface friction coefficient and share the friction map with vehicles 101.

In some examples, processing circuitry 304, or processing circuitry of external computing system 122, may determine a relationship between changes in magnitude of the first lateral force and the one or more slip angles (606). For example, processing circuitry 304 may determine a tire curve as discussed below with reference to FIGS. 7 and 9. Processing circuitry 304 may determine the tire curve from extrapolated data. The relationship may be stored in a database that includes lateral force magnitude and corresponding slip angle data, such that the processing circuitry 304 may determine slip angle values that are related to lateral force magnitudes and changes in lateral force magnitudes as processing circuitry 304 increases or decreases the lateral force magnitude during the lateral force excitation event.

In some examples, processing circuitry 304 or processing circuitry of external computing system 122, may estimate, from the relationship between changes in magnitude of the first lateral force and the one or more slip angles, a surface friction coefficient (608). For example, processing circuitry 304 may identify a peak value, or peak values as in a plateau, from the relationship between changes in magnitude of the first lateral force and the one or more slip angles to estimate the surface friction coefficient from the peak value or peak values. For example, in the example of FIG. 7, the peak value of tire curve 704A is approximately 1.0 and thus, the surface friction coefficient is the same number of approximately 1.0. In any event, processing circuitry 304 may estimate the surface friction coefficient based on sensor data received from vehicle 101A. For example, computing system 120 may access one or more tire models 356 to determine the surface friction coefficient. Models 156 may be pre-programmed or may be trained using a ML model.

In another example, processing circuitry 304 of computing system 120 determines the surface friction coefficient based on the sensor data generated by sensors 316. For example, processing circuitry 304 may apply one or more models 356 to the sensor data to determine the surface friction. In other words, models 356 may receive the sensor data as inputs and may output an estimated the coefficient of friction between surface 102 and the tires of vehicle 101A.

In one example, computing system 120 transmits all or a portion of the sensor data generated by sensors 316 to another computing system, such as external computing system 122 of FIG. 1, such that external computing system 122 may estimate the surface friction based on the sensor data. For example, computing system 120 may transmit raw sensor data relating to slip angles and force magnitudes to external computing system 122.

In another example, processing circuitry 304, or processing circuitry of external computing system 122, may determine a relationship between changes in magnitude of a lateral force excitation and one or more slip angles that result from the lateral force excitation and determine a tire model based on the relationship. In such examples, computing system 120 may transmit the tire model to external computing system 122, such that external computing system 122 may estimate the surface friction coefficient using peak values or extrapolated data from the tire model curve. For example, external computing system 122 or computing system 120 may extrapolate the tire model curve from one or more slip angles and force magnitudes to estimate the surface friction coefficient using peak extrapolated data values. In addition, computing system 120 may transmit the tire model curve data to external computing system 122, such that external computing system 122 may estimate the surface friction coefficient based on the tire model curve data and/or based on friction data received from other vehicles 101.

In examples where external computing system 122 estimates the surface friction coefficient, computing system 122 may transmit the surface friction coefficient to processing circuitry 304 of computing system 120. As such, processing circuitry 304 of computing system 120 may identify the surface friction coefficient for use in maneuvering one of vehicles 101, such as vehicle 101B similarly comprising computing system 120. In another example, processing circuitry 304 of computing system 120 may estimate and identify the surface friction coefficient based on the slip angle data and force magnitudes. In some examples, processing circuitry 304 may transmit to external computing system 122 (e.g., a remote server) slip angle data including at least one slip angle and corresponding lateral force magnitude, such as a peak lateral force value, and receive from the remote server the surface friction coefficient estimated from the transmitted data.

In some examples, computing system 120 may cause maneuvering of the vehicle to be based at least in part on the estimated surface friction coefficient (610). In some examples, computing system 120 may output the surface friction coefficients to storage device(s) 308. As such, computing system 120 may utilize a stored surface friction coefficient or coefficients in determining a following distance and/or a stopping distance. As one example, processing circuitry 304 may determine a preferred following distance for vehicle 101A based on the estimated surface friction coefficient of surface 102. In another example, computing system 120 may determine a navigation route (or update the route) for vehicle 101A or another one of vehicles 101 based on the estimated surface friction coefficient. In addition, computing system 120 may receive from external computing system 122, or from another one of vehicles 101, a suggested speed and/or suggested following distance based on the estimated surface friction coefficient.

In some examples, computing system 120 may output the surface friction coefficients to external computing system 122. External computing system 122 may, in turn, transmit information to one or more of vehicles 101 indicating vehicle maneuvers for vehicles 101 based at least in part on one or more estimated surface friction coefficients. In some examples, vehicle maneuvering indications may be based on a combination of surface friction coefficients estimated for multiple surfaces 102, such as a based on a combination of a first surface friction coefficient estimated for a surface 102 leading up to a bridge and a second surface friction coefficient estimated for the surface of the bridge. In this way, computing system 120 may determine following distances and/or stopping distances based on changes in surface friction coefficients as vehicle 101A traverses multiple surfaces 102.

Vehicles 101 may receive all or a portion of the surface friction data of surface data 350. In some examples, processing circuitry 304 adjusts operation of vehicle 101A based on surface data 350 (e.g., surface friction coefficient estimates). For example, vehicles 101A and 101B may automatically adjust (e.g., decrease) their speed or output a notification suggesting a different (e.g., lower) speed based on the surface data 350 when traversing surface 102. In another example, vehicles 101A and 101B may automatically adjust (e.g., increase) a following distance or output a notification suggesting a different (e.g., increased) following distance when traversing surface 102 based on surface data 350.

In some examples, processing circuitry 304 may cause maneuvering of vehicle 101A to be based on the estimated surface friction coefficient. For example, processing circuitry 304 may determine a following distance and/or a stopping distance based on the estimated surface friction coefficient. In some examples, processing circuitry 304 updates the friction data of surface data 350 with the estimated surface friction coefficients. In some examples, processing circuitry 304 transmits the estimated road friction to external computing system 122 or other vehicles 101.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 7:
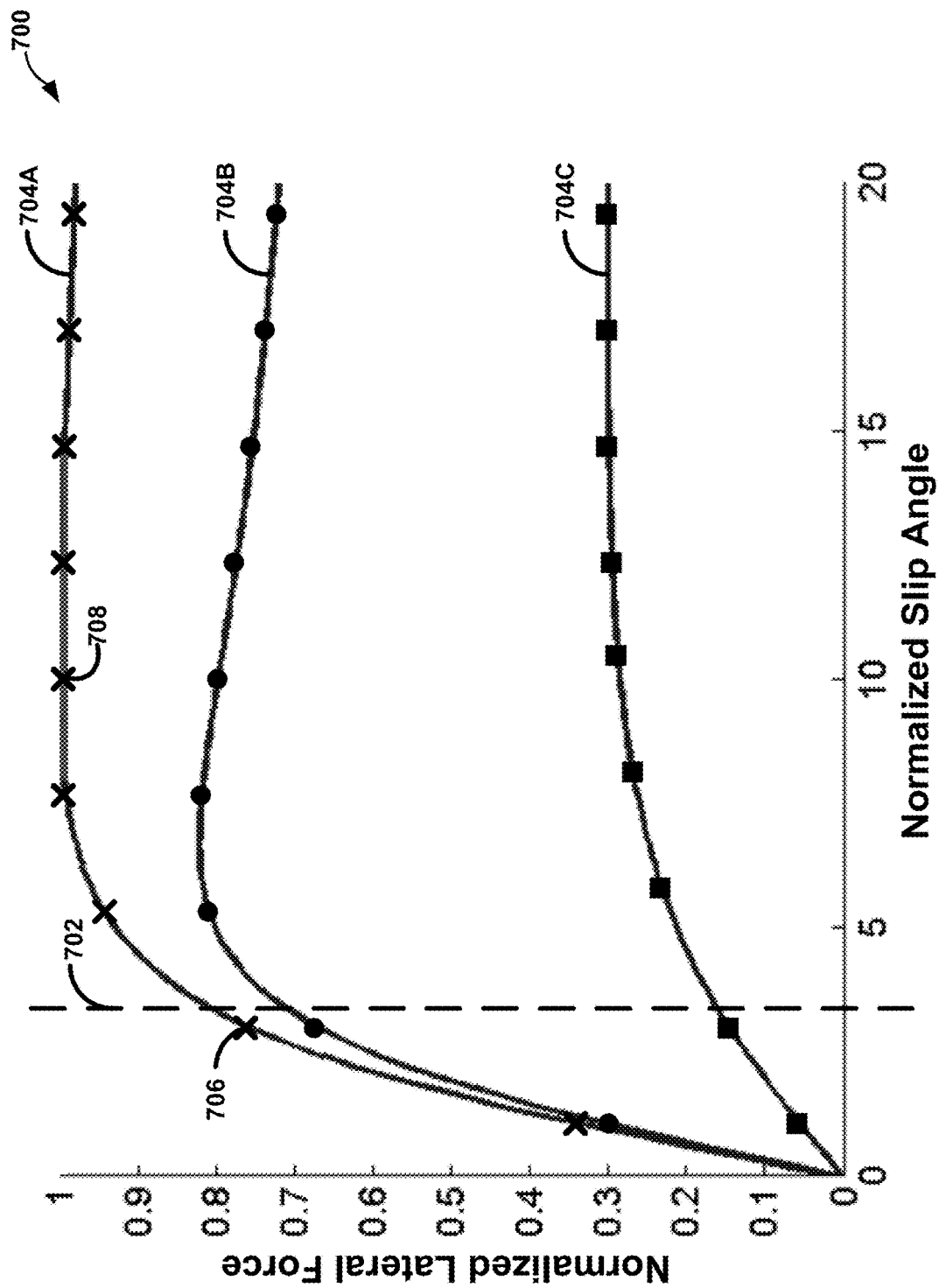
FIG. 7 is an example tire model curve illustrating multiple slip angle and lateral force relationships with respect to various example surfaces, in accordance with one or more techniques of this disclosure.

FIG. 7 is an example illustrating multiple slip angle and lateral force relationships with respect to various example surfaces. In the example shown, the relationships between changes in magnitude of the lateral force and the one or more slip angles are represented as example tire model curves.

In some examples, tire model curve 700 may illustrate a relationship between slip angles of a wheel and the lateral force applied to a wheel. The lateral force may include scaled or normalized values of lateral forces. In the example of FIG. 7, normalized lateral force values range from 0 to 1.0. In some examples, normalized lateral force values may range from 0 to 100 percent. Computing system 120 may determine, based on the actual lateral force applied to a rear wheel 104C, one or more normalized lateral force values ranging. Computing system 120 may determine a tire model curve using the normalized lateral force values and corresponding normalized slip angles. In some examples, processing circuitry 304 may normalize slip angle data based on vehicle mass (e.g., weight, vertical load, etc.).

In some examples, processing circuitry 304 may determine the normalized lateral force based on a grip force (e.g., longitudinal or lateral) and vehicle mass (e.g., vertical load). For example, sensors 316 may determine the grip force and vehicle mass of vehicle 101A. For example, processing circuitry 304 may determine the normalized lateral force by dividing the grip force by the vehicle mass. In this way, the maximum y-axis value may be set to equal 1.0. That is, the maximum normalized lateral force value may correspond to the maximum available friction coefficient of 1.0 based on a normalization of lateral force magnitude values.

With reference to FIG. 7, computing system 120 may determine tire model curve 700. In some examples, computing system 120 may determine that tire model curve 700 approximates curve 704A. That is, FIG. 7 shows three example tire model curves for three different example surfaces, but during a lateral force excitation maneuver, tire model curve 700 would approximate a tire model curve of surface having a particular friction coefficient.

In some examples, curve 704A represents a surface comprising dry asphalt. For example, the slip angle data and the lateral force data received, when plotted as a tire model curve using normalized force and slip angle values, may resemble curve 704A, indicating that surface 102 comprises dry asphalt. Processing circuitry 304 may determine the surface friction coefficient based on one or more peak values from the tire curve 704A. For example, computing system 120 may identify data point 708 as representing a peak value of curve 704A. In such examples, processing circuitry 304 may estimate the surface friction coefficient from the peak value of curve 704A. In some examples, processing circuitry 304 may determine the surface friction coefficient as a statistical representation based on multiple peak values, such as an average of peak data points, standard deviation, median, mode, or range of peak data points. For example, computing system 120 may average a subset of data points that represent the highest data points of tire model curve 700. In the example of FIG. 7, the highest data points may be data point 708 and data points to the immediate left of data point 708 and to the immediate right of data point 708. In any event, processing circuitry 304 may determine, based at least in part on the one or more peak values, the surface friction coefficient. That is, the surface friction coefficient corresponds to the peak values or plateau of a tire curve.

In another illustrative example, curve 704B may represent a tire model curve in cases where surface 102 comprises wet asphalt and curve 704C may represent a tire model curve determined for surface 102 comprising snow. Based on the peak values with respect to peak values along the y-axis, the surface friction coefficients for the surfaces represented in FIG. 7 may be as follows: 1.0 surface friction coefficient ($\mu$) for the dry asphalt surface, 0.8$\mu$ for the wet asphalt surface, or 0.3$\mu$ for the snow-covered surface. That is, computing system 120 may estimate a surface friction coefficient as a function of the normalized lateral force. For example, where the peak normalized lateral force is 0.3 as in curve 704C, processing circuitry 304 may estimate the surface friction coefficient to be 0.3$\mu$. Processing circuitry 304 may then determine the surface type based on the estimated surface friction coefficient (e.g., snow). Processing circuitry 304 may reference a look-up table stored as part of surface data 350 to determine the surface type using the estimated surface friction coefficient. As such, computing system 120 may identify, from the tire model curve, a type of driving surface corresponding to the surface friction coefficient.

In some examples, processing circuitry 304 may increase or decrease a confidence interval. For example, processing circuitry 304 may determine a confidence interval that indicates how confident processing circuitry 304 is that the coefficient estimate is an accurate estimate. For example, processing circuitry 304 may first estimate a surface friction coefficient and determine that the estimate may be inaccurate based on statistical data representing other estimates received from other vehicles 101, such as vehicle 101B or a vehicle traveling ahead of vehicle 101A. For example, processing circuitry 304 may compare an estimated surface friction coefficient to an average or perform a standard deviation analysis using the estimated surface friction coefficient.

In some examples, processing circuitry 304 may use data from weather data 354 to determine whether the surface friction coefficient estimated by computing system 120 is likely an accurate estimate. For example, if weather data 354 indicates that the surface area pertaining to where processing circuitry 304 performed the lateral force excitation has received snow, then processing circuitry 304 may increase a confidence interval for a surface friction coefficient estimate that indicates a snow-covered surface. In some examples, based on a confidence interval, processing circuitry 304 may determine the estimated surface friction coefficient should be used to control maneuvering of vehicle 101A.

Although described in terms of processing circuitry 304 performing various techniques disclosed, the techniques of this disclosure are not so limited, and other computing devices having processing circuitry (e.g., external computing system 122) may perform one or more of the various functions described. For example, external computing system 122 may include processing circuitry 304 or other processing circuitry configured to perform one or more techniques of this disclosure. In such examples, computing system 120 of a measuring vehicle 101A may cause a lateral force excitation of one or more rear wheels, receive sensor data (e.g., slip angles, force magnitudes, etc.) from sensor(s) 316, and transmit the sensor data (e.g., raw sensor data, processed sensor data) to processing circuitry of external computing system 122. Processing circuitry of external computing system 122 may determine a relationship between changes in magnitude of the lateral force and the one or more slip angles. For example, processing circuitry of external computing system 122 may determine a tire model curve using the data received from computing system 120. Processing circuitry of external computing system 122 may estimate the surface friction coefficient from the determined relationship and transmit the surface friction coefficient to computing system 120 of one of vehicles 101, for example, as an updated surface friction coefficient map, a road surface categorization (e.g., snowy surface), or as a single coefficient value. Processing circuitry 304 of computing system 120 of a receiving vehicle 101 may utilize the estimated surface friction coefficient to cause maneuvering of the receiving vehicle 101 to be based on the estimated surface friction coefficient. That is, processing circuitry 304 may identify a surface friction coefficient that processing circuitry 304 may use to at least partially maneuver the receiving vehicle 101.

In some examples, processing circuitry 304 may increase the lateral force for one or more wheels, until a slip angle threshold is satisfied. In some examples, processing circuitry 304, or another system, such as processing circuitry of external computing system 122, may define a slip angle threshold. That is, in some examples, the slip angle threshold may be predefined by processing circuitry 304 or processing circuitry of external computing system 122. In some examples, processing circuitry 304 or processing circuitry of external computing system 122 may determine the slip angle threshold as part of the surface friction coefficient estimation. For example, processing circuitry 304 may determine a desired confidence interval for the surface friction coefficient estimation. In addition, the purpose of the slip angle threshold may be to monitor for vehicle instabilities, such that processing circuitry 304 may adjust the slip angle threshold as processing circuitry 304 detects vehicle instabilities or indications that vehicle instabilities may occur.

In one example, processing circuitry 304 or processing circuitry of external computing system 122 may determine that a particular slip angle threshold for an excited rear wheel is reached when a desired confidence interval for the surface friction coefficient estimation is satisfied (e.g., exceeds a confidence threshold). In this way, processing circuitry 304 may then determine the magnitude of a lateral force excitation that results in a rear wheel steering angle that may allow processing circuitry 304 to estimate a surface friction coefficient at a desired friction estimation confidence interval while minimizing potential instabilities of the vehicle system. In any event, the confidence interval may increase as the rear wheel steering angle is increased because more friction data (e.g., slip angle data) is then available for processing circuitry 304 to estimate the surface friction coefficient.

In examples involving external computing system 122, external computing system 122 may transmit the slip angle threshold to computing system 120. In some examples, processing circuitry 304 may define a slip angle threshold based on a maximum slip angle that vehicle 101A can tolerate during a lateral force excitation event without causing an instability in vehicle 101A. In some instances, processing circuitry 304 may determine the slip angle threshold to correspond to approximately a three degree slip angle (e.g., 3°±0.1°, 3°±0.2°, between 3° and 2.9° or 2.95±0.05°, etc.). For example, the line 702 of FIG. 7 may represent the slip angle threshold as being approximately three degrees. That is, the slip angle threshold is satisfied when a current slip angle is greater than or equal to approximately three degrees.

In some examples, the slip angle threshold may be based on the particular properties of a specific tire in use (e.g., tire tread level, tire dimensions, etc.), as well as road conditions, such as whether the road conditions are dry, wet, snow, or icy road conditions. In such instances, a slip angle threshold may be less than three degrees. In some examples, processing circuitry 304 may set the slip angle threshold based on the overall vehicle dynamics. For example, processing circuitry may determine the overall vehicle dynamics at any given time based on the vehicle dynamics models of vehicle data 352. As such, processing circuitry 304 may increase or decrease the slip angle threshold based on the overall vehicle dynamics.

In some examples, processing circuitry 304 may increase or decrease the slip angle threshold based on a particular lateral force excitation event. For example, processing circuitry 304 may perform, in a first instance, a cornering maneuver and/or a friction estimation maneuver that indicates the slip angle threshold in a second instance should be adjusted upward or downward. In any event, processing circuitry 304 may identify a maximum slip angle threshold that serves as a hard limit of the vehicle system, such as a three degree hard limit, that should not be exceeded. In some examples, processing circuitry 304 may determine the maximum slip angle threshold based on practical limitations and particular designs of RWS systems. In some instances, the particular design of a particular RWS system may not allow more than five degree slip angles per wheel based on various RWS system designs. As such, processing circuitry 304 may determine the maximum slip angle threshold as being between three degrees and five degrees, in various instances.

In some examples, processing circuitry 304, or another system, such as processing circuitry of external computing system 122, may define an alert threshold. For example, the notification threshold may be a friction coefficient amount that represents a friction coefficient amount that should trigger a notification. For example, processing circuitry 304 may define 0.4 as a notification threshold, in which case processing circuitry 304 may provide an alert if the friction coefficient falls below a certain coefficient value or range of values or in some examples, increases above coefficient value or range, depending on how the threshold is set. For example, a user of vehicle 101A may set the threshold limit to only provide an alert, or provide surface friction details, if the friction coefficient falls below 0.4 or rises above 0.4. Processing circuitry 304 may provide a tiered notification system, where different notifications may be triggered by variations in friction coefficients. Processing circuitry 304 may provide a notification in advance of one of vehicles 101 approaching a particular surface, for example, based on a surface friction map.

In some examples, processing circuitry 304 may avoid approaching the slip angle threshold by extrapolating data and determining whether the extrapolation results in a curve that resembles a tire model curve, such as one of tire curves 704. For example, processing circuitry 304 may receive data point 706 prior to reaching the slip angle threshold and determine that data points 706, as well as data points to the left of data point 706 on the graph, provide enough data to extrapolate a tire model curve that resembles a known tire model curve. Processing circuitry 304 may determine that a threshold amount of data has been received using one or more ML models that attempt to extrapolate a tire model curve using data points as the data points become available to processing circuitry 304. Processing circuitry 304 may receive an indication from an ML model that a sufficient amount of data has been received, such that an adequate tire model curve may be determined from extrapolation results, that processing circuitry 304 may use to identify a surface friction coefficient. In some examples, processing circuitry 304 may transmit the known data points to external computing system 122, such that external computing system 122 may extrapolate the tire model curve and estimate the surface friction coefficient from the tire model curve. In such examples, external computing system 122 may transmit the estimated surface friction coefficient or a friction map updated to include the estimated surface friction coefficient to be used by processing circuitry 304 of vehicles 101A, 101B, or any other vehicle traversing surface 102 in order to maneuver vehicles 101.

In an illustrative example, processing circuitry 304 may estimate the surface friction coefficient using extrapolated data determined during a cornering maneuver. For example, during a cornering driving mode, processing circuitry 304 may apply a lateral force excitation to turn the tire so as to turn the vehicle. In addition, processing circuitry 304 may apply an additional lateral force excitation to estimate the surface friction coefficient during the turn. In such examples, processing circuitry 304 may determine the highest concentration of slip angle data available at a given lateral force magnitude relative to the lateral force excitation attributable to the turn. That is, processing circuitry 304 may apply a first lateral force excitation for the turn and a second lateral force excitation during the turn to cause additional slip that is attributable to the second surface friction coefficient.

In such examples, processing circuitry 304 may extrapolate tire curve 704 with a relatively low level of lateral force excitation. That is, processing circuitry 304 may apply a relatively low magnitude lateral force for the lateral force excitation and thereby, cause little slip of the tire while obtaining sufficient data to extrapolate a tire curve 704.

In some examples, during a cornering maneuver, processing circuitry 304 may use the first lateral force excitation and slip angle data corresponding to the first lateral force excitation to estimate the surface friction coefficient. That is, processing circuitry 304 may obtain a sufficient amount of data from the first lateral force excitation maneuver in order to extrapolate the data so as to obtain a proper tire model curve. In such examples, processing circuitry 304 may apply the second lateral force excitation in cases where processing circuitry 304 is unable to obtain a sufficient amount of data to extrapolate the tire curve 704. In such instances, processing circuitry 304 may determine peak values using lateral force magnitudes and slip angle data that are relative to the first lateral force excitation that is used to cause vehicle 101 to perform a cornering maneuver.

In some examples, processing circuitry 304 may extrapolate from the slip angle and lateral force data to obtain a tire curve and compare the tire curve to other tire model curves. Processing circuitry 304 may estimate the surface friction coefficient from the peak value of the extrapolated tire curve. Processing circuitry 304 may use the surface friction coefficient to control the maneuvering of vehicle 101. For example, processing circuitry 304 may increase or decrease. In any event, processing circuitry 304 may remove the tire force excitation used to estimate the surface friction coefficient, such that processing circuitry 304 may revert back to a lateral excitation used for the cornering maneuver. In some examples, processing circuitry 304 may steer the real wheels during a RWS cornering maneuver using a steering amount that takes into account the estimated surface type and estimated surface friction coefficient to avoid oversteering or understeering during the cornering maneuver.

In some examples, processing circuitry 304 may estimate surface friction coefficients using non-normalized tire force excitation data, such as the lateral force data or the slip angle data. For example, the processing circuitry 304 may determine the relationship between changes in magnitude of the lateral force and the slip angles using raw force data and/or raw slip angle data. In some examples, processing circuitry 304 may normalize the raw force data and/or raw slip angle data based on the vertical load on rear wheel 104C or 104D or the rear axle. In such examples, if only one rear wheel is excited (e.g., saturated), then the vertical load on that wheel should be estimated. As such, forces in the x (e.g., lateral direction, $F_x$) and z direction (vertical load, $F_z$) may be used to as input to estimate the surface friction coefficient based on the tire model.

In some examples, processing circuitry 304 may increase the magnitude of the lateral force excitation until the slip angles satisfy the slip angle threshold. For example, processing circuitry 304 may determine that the slip angle threshold is satisfied when a current slip angle is greater than or equal to approximately three degrees. In some examples, computing system 120 may determine that the slip angle threshold is satisfied when the current slip angle value approaches the slip angle threshold or is on a trajectory to reach the slip angle threshold.

In some examples, in response to determining that the one or more slip angles satisfy the slip angle threshold, processing circuitry 304 may determine a peak magnitude of the first lateral force. As discussed above, the first lateral force may be modeled as a normalized lateral force, as in FIG. 7. In such examples, processing circuitry 304 may extrapolate from the data points received prior to the slip angle threshold being satisfied in order to determine additional extrapolated data points for tire model curve 700. For example, the data points to the right of slip angle threshold 702, including data point 708, may be extrapolated from data points to the left of slip angle threshold 702. As such, processing circuitry 304 may extrapolate lateral force and slip angle data using one or more magnitudes of the first lateral force and the one or more determined slip angles.

In some examples, processing circuitry 304 may determine whether a threshold amount of slip angle data has been received in order for processing circuitry 304 to extrapolate a relationship trend that approximates at least one known tire model curve. For example, processing circuitry 304 may determine that after receiving a small amount of slip angle data whether the curve is going to resemble 704C. As such, processing circuitry 304 may cause excitation of the rear wheel to cease or discontinue in response to determining a threshold amount of data has been received. In some examples, processing circuitry 304 may continue to provide excitation to the rear wheel for driving operations (e.g., turning, toe-in), but cease or discontinue the excitation used to gather the slip angle data in order to estimate the surface friction coefficient.

In some examples, processing circuitry 304 may periodically attempt to extrapolate data for tire curve 704 until sufficient data is available, such that the extrapolated data results in a tire curve 704 that resembles a historical tire curve (i.e., a previously validated tire curve). For example, processing circuitry 304 may extrapolate data from slip angle data at a first time when the lateral force is insufficient to provide a threshold amount of data. For example, processing circuitry 304 may determine that a first tire curve based on extrapolated data does not resemble a tire model curve known for any surface. Processing circuitry 304 may increase the lateral force excitation magnitude until sufficient data is available to extrapolate tire curve 704 to resemble a known tire model curve, where the peak value then indicates an estimated friction coefficient of the driving surface.

In some examples, processing circuitry 304 may determine a relationship between changes in magnitude of the first lateral force and the one or more slip angles using the one or more slip angles and the peak magnitude of the first lateral force, where in some instances, the peak magnitude may include extrapolated data. For example, processing circuitry 304 may determine the peak magnitude of the first lateral force from the extrapolated data points in the case that the extrapolated data points include peak values of the tire model curve 700. That is, in some examples, the peak values may correspond to data values that are extrapolated from actual slip angle and lateral force data in response to processing circuitry 304 determining that the current slip angle has satisfied the slip angle threshold. In any event, processing circuitry 304 may determine the relationship between changes in magnitude of the first lateral force and the one or more slip angles using the extrapolated data.

In some examples, processing circuitry 304 may provide tire model data to a display system of computing system 120, such that the display system may visually depict the tire model data for a user to perceive the tire model data visually on a display device. For example, processing circuitry 304 may provide the normalized or non-normalized lateral force values and corresponding slip angles data to the display system, such that the display system may generate a graphical illustration of tire curve 704, including in some examples, a visual representation of a contoured data mass as described with reference to FIG. 9. As such, processing circuitry 304 may cause output of visual illustrations and representations of friction or tire model data for visual display. In another example, computing system 120 may transmit such lateral force excitation data, in a raw or post-processed format, to external computing system 122 via network 110 or to another one of vehicles 101, such as vehicle 101B, via network 110.

In some examples, processing circuitry 304 may determine the relationship between force magnitude and slip angle without visually rendering tire curve 704 for visual display. For example, processing circuitry 304 may store respective slip angle and force values to storage device 308 (e.g., tire models 356). In one example, processing circuitry 304 may store actual data values to storage device 308. For example, the actual data values may include normalized data, raw data, conversion data mathematically converted using raw data, or other processed data using various signal processing techniques. In addition, processing circuitry 304 may store values interpolated and/or extrapolated using actual data values. In some examples, processing circuitry 304 may align the normalized lateral force data with the slip angle data so as to track the relationship between the changes in magnitude of the normalized lateral force and slip angle values in a table format that allows processing circuitry 304 to filter on the peak normalized lateral force values. In such examples, processing circuitry 304 may use stored data to perform a comparison of stored values, such as lateral force data and corresponding slip angle data, in order to identify trends that indicate peak values or plateaus in lateral force data and thereby, estimate surface friction coefficients.

Figure 8A:
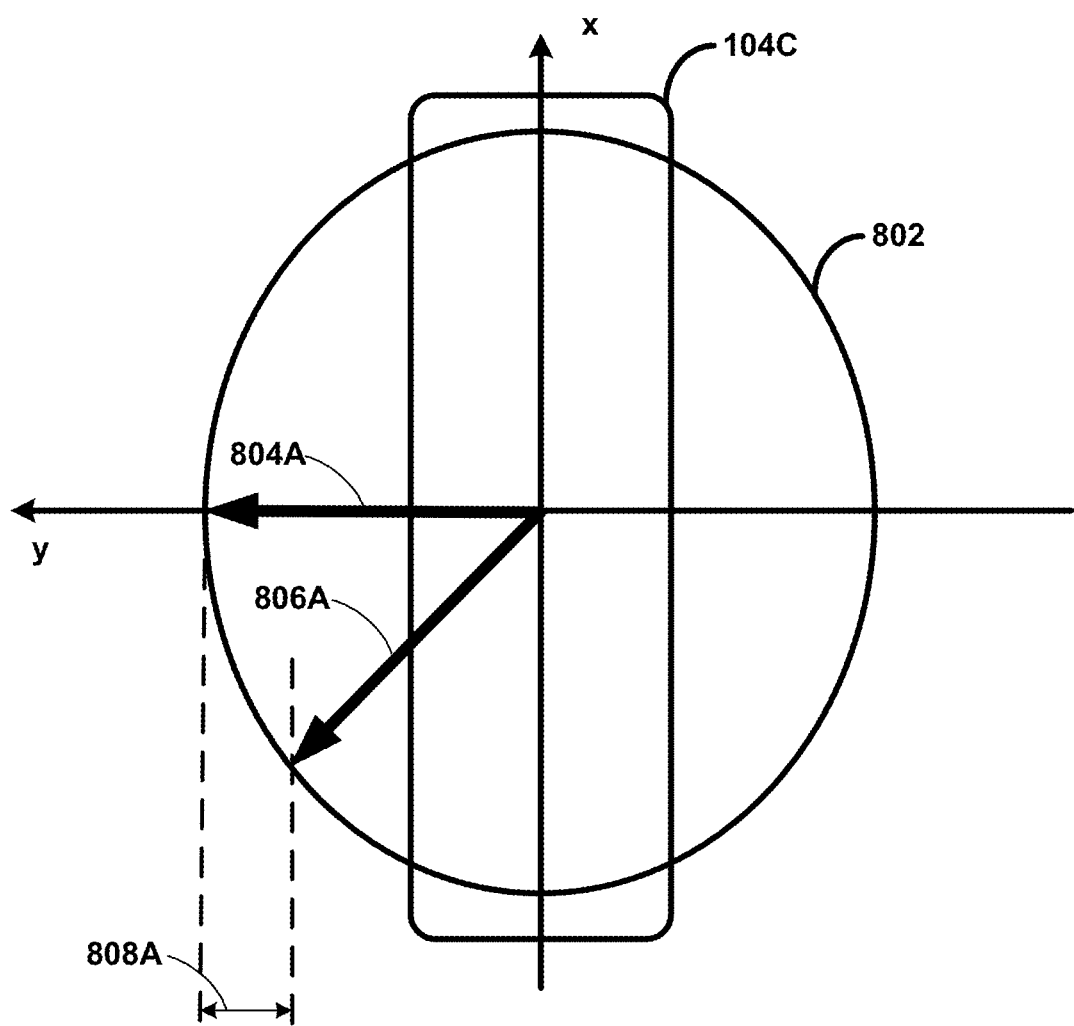
FIGS. 8A and 8B are conceptual diagrams illustrating an example dual application of lateral force and longitudinal force excitations, in accordance with one or more techniques of this disclosure.
Figure 8B:
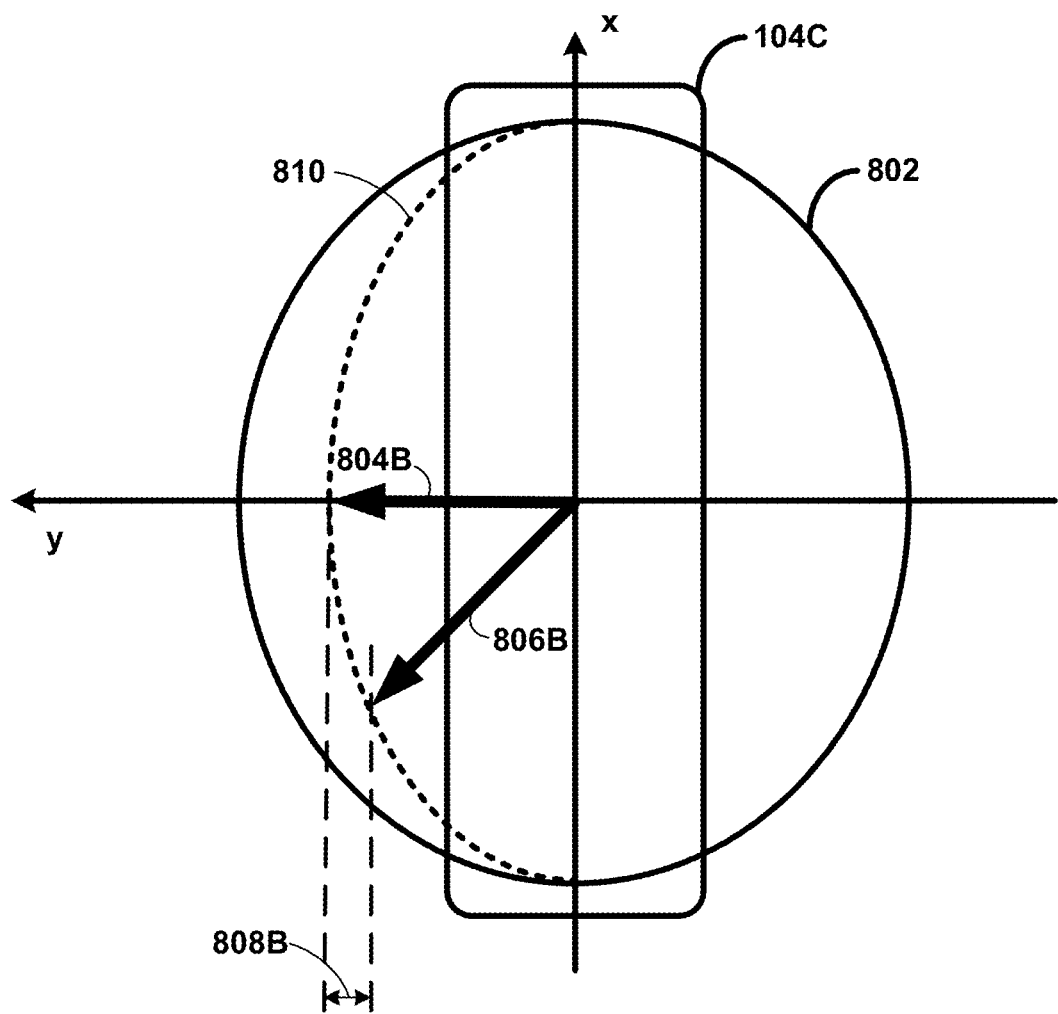

In some examples, processing circuitry 304 may utilize longitudinal force excitation in conjunction with lateral force excitations. FIGS. 8A-8B are conceptual diagrams illustrating example combinations of lateral force and longitudinal force excitations at different lateral force and braking force magnitudes.

FIG. 8A illustrates rear wheel 104C/D for example as may be seen from a top view perspective. FIG. 8A illustrates a visual representation of a friction limit 802. The particular size and shape of friction limit 802 corresponds to an available grip force that a tire can obtain from a particular surface. In this way, the particular size and shape of friction limit 802 depends on the friction coefficient of a particular surface. In some examples, friction limit 802 may be almost circular although not entirely. Because friction limit 802 is an ellipse in this example, the size and shape of the ellipse is dependent on the surface friction coefficient.

In a driving mode involving lateral and longitudinal force excitations (e.g., combining lateral force during cornering and braking force), processing circuitry 304 may determine the friction limit 802 using both braking force and lateral force on a rear wheel 104C/D, where arrow 804A indicates the lateral force magnitude and vector 806A indicating the longitudinal force magnitude, such as a braking force. As such, the lost lateral force indicated by arrow 808A from the braking force is illustrated as the difference between 804A and 806A. As such, the longitudinal force indicated by vector 806A may be combined with the lateral force to complete the friction limit 802.

In some examples, at different lateral/turning/cornering maneuvers, processing circuitry 304 may be able to provide different magnitudes of lateral force. For example, where the lateral force magnitude is high, such as is illustrated with reference to FIG. 8A, the loss of lateral force may be comparatively higher when processing circuitry 304 applies braking/traction at a turn. In such examples where longitudinal force excitations are used in conjunction with lateral force excitations, processing circuitry 304 may be able to provide enhanced friction excitation maneuvers at a higher confidence interval. That is, processing circuitry 304 may increase a confidence interval when longitudinal force excitations are used in conjunction with lateral force excitations.

In some examples, processing circuitry 304 may estimate the surface friction coefficient from the friction limit 802. For example, processing circuitry 304 may estimate the surface friction coefficient based on the measured tire forces divided by the estimated vertical load on respective rear wheels 104C or 104D. In the example of FIG. 8A, processing circuitry 304 may determine vector properties of vector 806A based on a relationship between vector 804A and a longitudinal braking force.

FIG. 8B is a conceptual diagram illustrating an example dual application of lateral force and longitudinal force excitations, in accordance with one or more techniques of this disclosure. FIG. 8B is similar to FIG. 8A except for that FIG. 8B illustrates an example where processing circuitry 304 has excited rear wheel 104C at a lesser lateral force magnitude in the lateral direction compared to a lateral force excitation illustrated in FIG. 8A. In such examples, processing circuitry 304 may excite rear wheel 104C more in the longitudinal direction in the presence of a lesser lateral force excitation. That is, the longitudinal force excitation in FIG. 8B is higher than the longitudinal force excitation in FIG. 8A, due to the difference in lateral force excitation magnitudes. In both FIGS. 8A and 8B, the surface friction coefficient may represent a same surface friction coefficient for a common surface 102. In the example of FIG. 8B, the lateral force magnitude is comparatively smaller at an early stage (e.g., before processing circuitry 304 applies braking/traction such as in response to a user command) compared to the comparatively higher lateral force magnitude shown in FIG. 8A.

In some examples, processing circuitry 304 may estimate the surface friction coefficient using a lesser lateral force indicated by vector 804B and braking force indicated by vector 806B resulting in a lower lost lateral force indicated by arrow 808B. That is, processing circuitry 304 may cause less lateral force and braking force in order to maintain stability of vehicle 101A due to the lower surface friction coefficient. In any event, processing circuitry 304 may estimate the surface friction coefficient from friction limit 802, with the dotted line of 810 illustrating the relationship between the decrease in lateral force, represented by vector 804B, and a corresponding increase in longitudinal force represented by vector 806B. In the example of FIG. 8B, processing circuitry 304 may determine vector properties of vector 806B (e.g., an amount of longitudinal force) based on properties of vector 804B (e.g., an amount of lateral force).

In the example of FIGS. 8A and 8B, vector arrows are used to denote directionality of applied forces. For example, an arrow pointing directly in the 'y' direction indicates lateral direction of vehicle 101A, whereas an arrow pointing directly in the 'x' indicates longitudinal direction. For example, an arrow pointing toward the top of the page in the 'x' direction indicates a force applied toward the front of vehicle 101A, such as when accelerating, and likewise, an arrow pointing toward the bottom of the page in the 'x' direction indicates a force applied toward the back of vehicle 101A, such as when braking.

In an illustrative example, processing circuitry 304 of vehicle 101A may determine a magnitude for a longitudinal force to apply to one or more rear wheels 104 of vehicle 101A. For example, processing circuitry 304 may determine a braking force to apply to one of rear wheels 104C/D. In another example, processing circuitry 304 may utilize the braking force applied by a driver of vehicle 101A, such as during a routine or emergency braking operation. As such, processing circuitry 304 may cause excitation of a rear wheel of the vehicle using a longitudinal force or may utilize data received during such braking operations. In some examples, vehicle 101A may perform so-called longitudinal friction probing by decreasing the rotational speed of one wheel while increasing the rotational speed of another wheel. For example, vehicle 101A may slow a first tire of vehicle 101A using a braking force while simultaneously accelerating a second tire of vehicle 101A. As one example, vehicle 101A may brake a rear axle (or a single rear wheel) via a friction or regenerative braking and propel a front axle (or single front wheel) via an internal combustion engine or electric motor. In such examples, processing circuitry 304 may determine, based at least in part on a combined-slip effect from a longitudinal force and a lateral force, the surface friction coefficient of a traveling surface. As such, processing circuitry 304 may apply less lateral force to the rear wheel than would otherwise be used without longitudinal friction probing.

Figure 9:
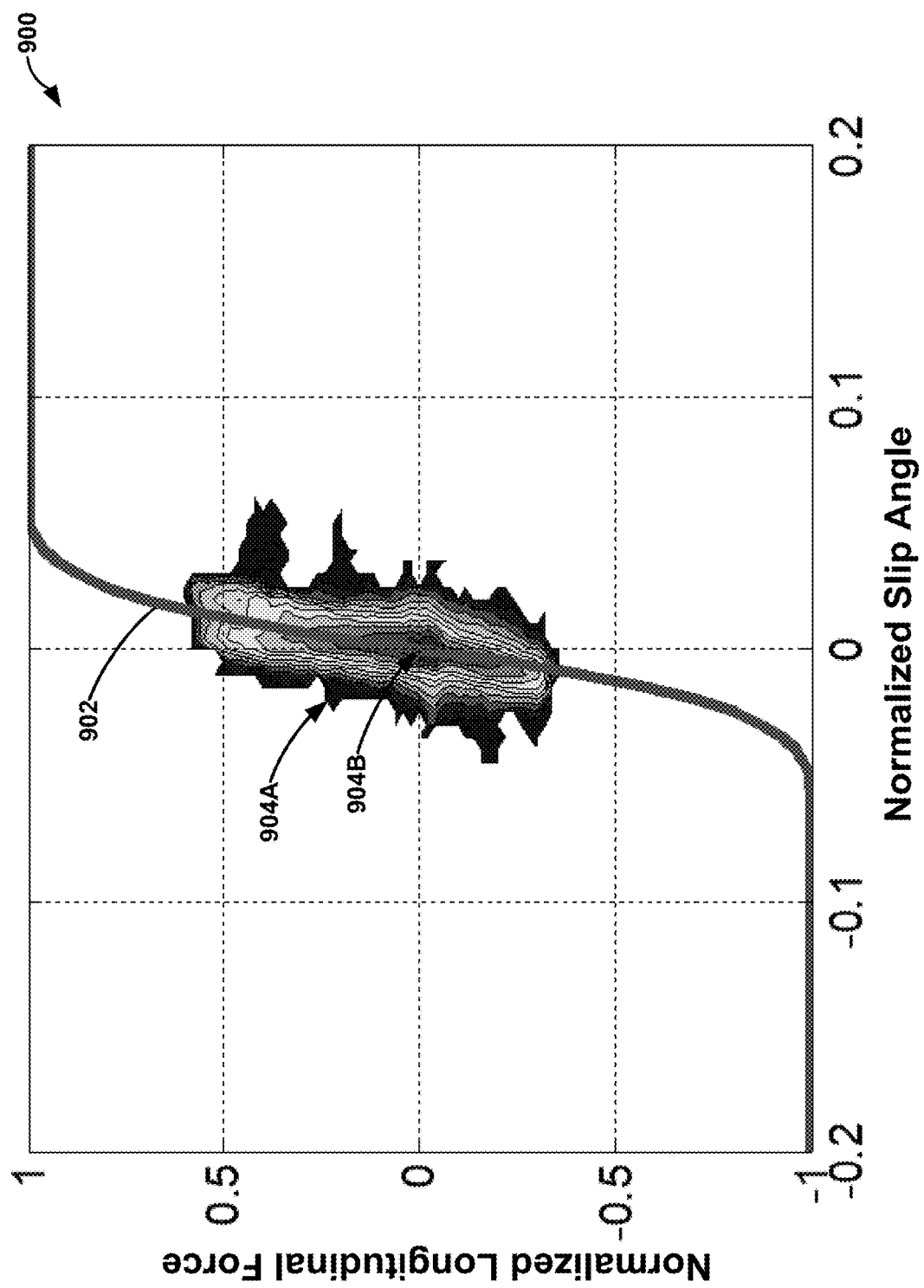
FIG. 9 is an example tire model curve illustrating an example concentration of data points with respect to an example surface and rear wheel.

FIG. 9 is an example tire model 900 illustrating an example concentration of data points with respect to an example surface and longitudinally excited rear wheel. It should be noted that FIG. 9 illustrates the limited degree of excitation achievable using longitudinal friction probing as compared to lateral force excitations of a rear wheel. However, as discussed with reference to FIGS. 8A and 8B, longitudinal forces may be used in conjunction with lateral forces to estimate the surface friction coefficient at relatively lower longitudinal and lateral force magnitudes compared to if either type of force were used in isolation. Tire model 900 of FIG. 9 is plotted with respect to the longitudinal forces on the Y-axis and the slip angle on the X-axis. The normalized slip angle may be unitless (speed/speed). In some examples, tire model 900 illustrates a relationship between changes in magnitude of a longitudinal force and one or more slip angles. That is, tire model 900 illustrates how an increasing longitudinal force from negative one normalized longitudinal force to positive one normalized longitudinal force affects the slip angle as one of rear wheels 104 traverses a particular surface having a particular surface friction coefficient. For example, the surface friction coefficient may be estimated from the tire curve 902 as being the peak value achieved as discussed with respect to FIG. 7. For illustrative purposes, tire curve 902 resembles tire model curve 704A indicating that rear wheels 104 are traveling on a surface having a relatively high surface friction coefficient, such as dry asphalt or a surface similar to that of dry asphalt having a high surface friction coefficient.

In some examples, processing circuitry 304 determines changes in magnitude of the longitudinal force excitation and normalizes the longitudinal force data using a normalization force function and/or normalization parameter(s). For example, processing circuitry 304 may apply a normalization force function and/or normalization parameters that scale the raw force data to achieve a target range of longitudinal force values (e.g., [−1, 1], [0, 1], [0, 1.5], etc.), such that, if used to graphically illustrate the relationship between the changes in force magnitude and the one or more slip angles, the graphical illustration of the curve would appear visually bounded by the predefined range values. In the example of FIG. 9, processing circuitry 304 may normalize the longitudinal force data to fit within a scale of [−1, 1]. In such examples, processing circuitry 304 may determine one or more peak values, or values at which processing circuitry 304 determines that the normalized longitudinal force has plateaued as the slip angle increases. In the example of FIG. 9, tire curve 902 is shown as increasing until the force plateaus at a normalized longitudinal force of approximately 1.0.

Similarly, processing circuitry 304 may normalize the slip angle data, from the raw slip angle data, as defined by a scaled range. While the scaled range for the slip data is shown in the example of FIG. 9 as being between [−0.2, 0.2], the techniques of this disclosure are not so limited, and processing circuitry 304 may use other ranges that provide other representative tire model curves based on raw slip angle data and raw longitudinal force data. In any event, processing circuitry 304 may use ranges that allow processing circuitry 304 to efficiently identify or determine plateaus or peak values in order to estimate the surface friction coefficient. For the x-axis in FIG. 9, the slip angle may be defined in percentage for longitudinal slip angle examples, or may be defined in degrees or radians for lateral slip angle examples.

In some examples, processing circuitry 304 may extrapolate longitudinal force and slip angle data for tire curve 902 using a particular amount of slip angle data from a contoured data mass, shown in FIG. 9 as ranging from contours 904A to 904B (collectively, contoured data mass 904). Processing circuitry 304 may combine the extrapolated slip angle data and extrapolated longitudinal force data with extrapolated slip angle data and extrapolated lateral force data of the rear wheels in order to estimate the surface friction coefficient as discussed with reference to FIGS. 8A and 8B.

In the example of FIG. 9, the gradient of contour 904A (shown toward the outer extreme of the contoured data mass 904) to contour 904B (shown toward the center of contoured data mass 904) illustrates a difference in the amount of data processing circuitry 304 can determine from the tire-to-surface contact patch of a longitudinally excited tire. For example, processing circuitry 304 determines a higher amount of slip angle data in the region of contour 904B compared to that of 904A. In such instances, processing circuitry 304 may extrapolate data to determine tire curve 902 using slip angle data that corresponds to the higher contour regions, such as contour 904B toward the center of the contact patch. Although FIG. 9 is discussed with reference to longitudinal force excitations, similar data may be obtained and used with respect to lateral force excitations of rear wheels consistent with this description.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. The following numbered examples may illustrate one or more aspects of the disclosure:

Example 1. A method comprising: causing excitation of a first rear wheel of a vehicle using a first lateral force that causes the first rear wheel to initiate turning in a first lateral direction; determining one or more slip angles that result from excitation of the first rear wheel; identifying a surface friction coefficient, the surface friction coefficient being based at least in part on a relationship between changes in magnitude of the first lateral force and the one or more slip angles; and causing maneuvering of the vehicle to be based at least in part on the surface friction coefficient.

Example 2. The method of example 1, further comprising: determining a second lateral force to excite a second rear wheel; and providing a control signal configured to maintain a force balance between at least the first lateral force and the second lateral force.

Example 3. The method of any one of examples 1 or 2, further comprising: determining the second lateral force based on a target steering angle of the second wheel as a product of a target steering angle of the first wheel multiplied by a control gain.

Example 4. The method of any one of examples 1-3, further comprising: increasing at least one of: the first lateral force or the second lateral force, until a slip angle threshold is satisfied.

Example 5. The method of any one of examples 1-4, further comprising: determining whether the one or more slip angles satisfy a slip angle threshold; in response to determining that the one or more slip angles satisfy the slip angle threshold, determining a peak magnitude of the first lateral force; transmitting, to a remote server, slip angle data, including at least one of the one or more slip angles, and the peak magnitude of the first lateral force; and receiving, from the remote server, the surface friction coefficient.

Example 6. The method of any one of examples 1-5, further comprising: determining whether a threshold amount of slip angle data has been received, wherein the threshold amount of slip angle data is a minimum amount of slip angle data required to allow extrapolation of a relationship trend that approximates at least one known tire model curve; and responsive to determining that the threshold amount of slip angle data has been received, ceasing excitation of the first rear wheel.

Example 7. The method of any one of examples 1-6, further comprising: determining a driving mode of the vehicle from at least one of: a cornering mode or a straight driving mode; and determining, based at least in part on the driving mode, directionality of the first lateral force.

Example 8. The method of any one of examples 1-7, further comprising, when in a cornering mode: determining a reference lateral force value; and determining, based at least in part on the reference lateral force value, a second lateral force to be applied to a second rear wheel.

Example 9. The method of any one of examples 1-8, further comprising: determining a longitudinal force to apply to the first rear wheel; causing excitation of the first rear wheel of the vehicle using the longitudinal force; and determining, based at least in part on a combined-slip effect from the longitudinal force and the first lateral force, the surface friction coefficient.

Example 10. The method of any one of examples 1-9, wherein the first rear wheel comprises a rear-most wheel relative to at least one other rear wheel of the vehicle.

Example 11. A computing system comprising: at least one processor; a memory comprising instructions that, when executed, cause the at least one processor to: cause excitation of a first rear wheel of a vehicle using a first lateral force that causes the first rear wheel to initiate turning in a first lateral direction; determine one or more slip angles that result from excitation of the first rear wheel; identify a surface friction coefficient, the surface friction coefficient identified based at least in part on a relationship between changes in magnitude of the first lateral force and the one or more slip angles; and cause maneuvering of the vehicle to be based at least in part on the surface friction coefficient.

Example 12. The computing system of example 11, further comprising means for performing the method of any one of examples 2-10.

Example 13. A computing system comprising means for performing the method of any one of examples 1-10.

Example 14. A computer-readable storage medium comprising instructions that, when executed by at least one processor of a computing system of a vehicle, cause the at least one processor to perform the method of any one of examples 1-10.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system for estimating surface friction coefficients, wherein the computing system comprises:
   at least one processor; and
   a memory comprising instructions that, when executed, cause the at least one processor to:
      cause excitation of a first rear wheel of a vehicle using a first lateral force that causes the first rear wheel to initiate turning in a first lateral direction;
      determine one or more slip angles that result from excitation of the first rear wheel;

identify a surface friction coefficient, the surface friction coefficient being based at least in part on a relationship between changes in magnitude of the first lateral force and the one or more slip angles; and
cause maneuvering of the vehicle to be based at least in part on the surface friction coefficient.

2. The system of claim 1, wherein the instructions further cause the at least one processor to:
determine a second lateral force to excite a second rear wheel; and
provide a control signal configured to maintain a force balance between at least the first lateral force and the second lateral force.

3. The system of claim 2, wherein to determine the second lateral force, the instructions further cause the at least one processor to:
determine the second lateral force based on a target steering angle of the second wheel as a product of a target steering angle of the first wheel multiplied by a control gain.

4. The system of claim 2, wherein the instructions further cause the at least one processor to:
increase at least one of: the first lateral force or the second lateral force, until a slip angle threshold is satisfied.

5. The system of claim 1, wherein the instructions further cause the at least one processor to:
determine whether the one or more slip angles satisfy a slip angle threshold;
in response to determining that the one or more slip angles satisfy the slip angle threshold, determine a peak magnitude of the first lateral force; and
transmit, to a remote server, slip angle data including at least one of the one or more slip angles and the peak magnitude of the first lateral force; and
receive, from the remote server, the surface friction coefficient.

6. The system of claim 1, wherein the instructions further cause the at least one processor to:
determine whether a threshold amount of slip angle data has been received, wherein the threshold amount of slip angle data is a minimum amount of slip angle data required to allow extrapolation of a relationship trend that approximates at least one known tire model curve;
cease excitation of the first rear wheel.

7. The system of claim 1, wherein the instructions further cause the at least one processor to:
determine a driving mode of the vehicle from at least one of: a cornering mode or a straight driving mode; and
determine, based at least in part on the driving mode, directionality of the first lateral force.

8. The system of claim 1, wherein, when in a cornering mode, the instructions further cause the at least one processor to:
determine a reference lateral force value; and
determine, based at least in part on the reference lateral force value, a second lateral force to be applied to a second rear wheel.

9. The system of claim 1, wherein the instructions further cause the at least one processor to:
determine a longitudinal force to apply to the first rear wheel;
cause excitation of the first rear wheel of the vehicle using the longitudinal force; and
determine, based at least in part on a combined-slip effect from the longitudinal force and the first lateral force, the surface friction coefficient.

10. The system of claim 1, wherein the first rear wheel comprises a rear-most wheel relative to at least one other rear wheel of the vehicle.

11. An apparatus for estimating surface friction coefficients, the apparatus comprising:
means for causing excitation of a first rear wheel of a vehicle using a first lateral force that causes the first rear wheel to initiate turning in a first lateral direction;
means for determining one or more slip angles that result from excitation of the first rear wheel;
means for identifying a surface friction coefficient, the surface friction coefficient being based at least in part on a relationship between changes in magnitude of the first lateral force and the one or more slip angles; and
means for causing maneuvering of the vehicle to be based at least in part on the surface friction coefficient.

12. A method for estimating surface friction coefficients, the method comprising:
causing excitation of a first rear wheel of a vehicle using a first lateral force that causes the first rear wheel to initiate turning in a first lateral direction;
determining one or more slip angles that result from excitation of the first rear wheel;
identifying a surface friction coefficient, the surface friction coefficient being based at least in part on a relationship between changes in magnitude of the first lateral force and the one or more slip angles; and
causing maneuvering of the vehicle to be based at least in part on the surface friction coefficient.

13. The method of claim 12, further comprising:
determining a second lateral force to excite a second rear wheel; and
providing a control signal configured to maintain a force balance between at least the first lateral force and the second lateral force.

14. The method of claim 13, further comprising:
determining the second lateral force based on a target steering angle of the second wheel as a product of a target steering angle of the first wheel multiplied by a control gain.

15. The method of claim 13, further comprising:
increasing at least one of: the first lateral force or the second lateral force, until a slip angle threshold is satisfied.

16. The method of claim 12, further comprising:
determining whether the one or more slip angles satisfy a slip angle threshold;
in response to determining that the one or more slip angles satisfy the slip angle threshold, determining a peak magnitude of the first lateral force;
transmitting, to a remote server, slip angle data, including at least one of the one or more slip angles, and the peak magnitude of the first lateral force; and
receiving, from the remote server, the surface friction coefficient.

17. The method of claim 12, further comprising:
determining whether a threshold amount of slip angle data has been received, wherein the threshold amount of slip angle data is a minimum amount of slip angle data required to allow extrapolation of a relationship trend that approximates at least one known tire model curve; and
responsive to determining that the threshold amount of slip angle data has been received, ceasing excitation of the first rear wheel.

18. The method of claim 12, further comprising:
determining a driving mode of the vehicle from at least one of: a cornering mode or a straight driving mode; and
determining, based at least in part on the driving mode, directionality of the first lateral force.

19. The method of claim 12, further comprising, when in a cornering mode:
determining a reference lateral force value; and
determining, based at least in part on the reference lateral force value, a second lateral force to be applied to a second rear wheel.

20. The method of claim 12, further comprising:
determining a longitudinal force to apply to the first rear wheel;
causing excitation of the first rear wheel of the vehicle using the longitudinal force; and
determining, based at least in part on a combined-slip effect from the longitudinal force and the first lateral force, the surface friction coefficient.

* * * * *